US012615120B2

(12) United States Patent
    Khoshnevisan et al.

(10) Patent No.: US 12,615,120 B2
(45) Date of Patent: Apr. 28, 2026

(54) UPLINK CONTROL CHANNEL GROUP AND CROSS-CARRIER SCHEDULING FOR USER EQUIPMENT COOPERATION

(71) Applicant: QUALCOMM Incorporated, San Diego, CA (US)

(72) Inventors: Mostafa Khoshnevisan, San Diego, CA (US); Yitao Chen, San Diego, CA (US); Aleksandar Damnjanovic, Del Mar, CA (US); Xiaoxia Zhang, San Diego, CA (US); Jing Sun, San Diego, CA (US); Tao Luo, San Diego, CA (US); Fang Yuan, Beijing (CN); Juan Montojo, San Diego, CA (US); Rajat Prakash, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 356 days.

(21) Appl. No.: 18/264,712

(22) PCT Filed: Apr. 16, 2021

(86) PCT No.: PCT/CN2021/087707

§ 371 (c)(1),
(2) Date: Aug. 8, 2023

(87) PCT Pub. No.: WO2022/217577

PCT Pub. Date: Oct. 20, 2022

(65) Prior Publication Data

US 2024/0113838 A1     Apr. 4, 2024

(51) Int. Cl.
    *H04L 5/00*          (2006.01)
    *H04W 72/21*       (2023.01)

(52) U.S. Cl.
    CPC ............ *H04L 5/0053* (2013.01); *H04L 5/001* (2013.01); *H04W 72/21* (2023.01)

(58) Field of Classification Search
    CPC ..... H04L 5/00; H04L 5/14; H04L 5/06; H04L 5/12; H04L 1/00; H04L 1/18;
    (Continued)

(56)                 References Cited

U.S. PATENT DOCUMENTS 8,934,459 B2 *   1/2015   Marinier ............. H04L 27/2646
                                                    370/336
9,030,957 B2 *   5/2015   Seo ........................ H04L 1/0073
                                                    370/252
                    (Continued)

FOREIGN PATENT DOCUMENTS

CN          110198210 A       9/2019
EP            2976923 B1       5/2017
WO      WO-2011082744 A2       7/2011

OTHER PUBLICATIONS

International Search Report and Written Opinion—PCT/CN2021/087707—ISA/EPO—Jan. 5, 2022 (2103022WO1).
                    (Continued)

*Primary Examiner* — Man U Phan
(74) *Attorney, Agent, or Firm* — NORTON ROSE FULBRIGHT US LLP

(57)               ABSTRACT

Uplink control channel group and cross-carrier scheduling is disclosed for cooperative communications of a virtual UE. In an aspect, a UE reports a cooperative configuration with member UEs of a virtual UE and reports associations between a plurality of component carriers (CCs) allocated to a cell group and each member UE of the virtual UE. The UE may then receive an uplink control transmission configuration message dividing each member UE into an assigned uplink control transmission group and assign one or more component CCs into one or more CC sets, wherein each CC set is assigned to each uplink control transmission group. The UE may receive an uplink scheduling message from a serving base station, wherein the uplink scheduling message
                    (Continued)

Report a cooperative configuration with one or more member UEs of a virtual UE. 500

Report associations between a plurality of CCs allocated to a cell group and each member UE of the virtual UE. 501

Receive an uplink control transmission configuration message dividing each member UE of the virtual UE into an assigned uplink control transmission group and assigning one or more component CCs into one or more CC sets, wherein each CC set is assigned to each uplink control transmission group. 502

Receive an uplink scheduling message including an uplink schedule for CCs within the CC set assigned to an uplink control transmission group associated with the UE. 503 includes an uplink schedule for CCs within the CC set assigned to an uplink control transmission group associated with the UE. Other aspects and features are also claimed and described.

26 Claims, 10 Drawing Sheets

(58) Field of Classification Search
CPC ..... H04W 72/21; H04W 72/10; H04W 72/04;
H04W 72/12; H04W 72/14; H04W 72/23;
H04W 36/00; H04W 36/06; H04W 36/30;
H04W 52/28; H04W 52/32; H04W 52/40;
H04W 52/14
USPC ......................................................... 370/329
See application file for complete search history.

(56) References Cited

U.S. PATENT DOCUMENTS

| | | | | |
|---|---|---|---|---|
| 9,191,172 B2 * | 11/2015 | Kim | ........................ | H04L 5/0053 |
| 9,357,549 B2 * | 5/2016 | Kim | ........................ | H04W 72/20 |
| 9,515,808 B2 * | 12/2016 | Damnjanovic | ....... | H04L 5/0091 |
| 9,955,465 B2 * | 4/2018 | He | ........................ | H04L 5/0094 |
| 10,701,581 B2 | 6/2020 | Seo et al. | | |
| 11,398,893 B2 * | 7/2022 | Venugopal | ............ | H04W 72/23 |
| 12,041,616 B2 * | 7/2024 | Zhou | ..................... | H04W 72/56 |
| 12,150,122 B2 * | 11/2024 | Huang | .................... | H04L 5/001 |
| 12,167,387 B2 * | 12/2024 | Akkarakaran | .......... | H04L 5/001 |
| 2017/0171899 A1 | 6/2017 | Seo et al. | | |
| 2020/0119849 A1 | 4/2020 | Su et al. | | |
| 2022/0070879 A1 * | 3/2022 | Ryu | .................. | H04W 72/0473 |
| 2022/0217746 A1 * | 7/2022 | Kang | .................. | H04B 7/0404 |
| 2023/0328753 A1 * | 10/2023 | Kim | .................. | H04W 72/1268 |
| | | | | 370/329 |

OTHER PUBLICATIONS

Huawei, et al., "Discussion on Network Assisted UE Cooperation for Rel-17", 3GPP TSG RAN Meeting #83, RP-190491, R17 Network Assisted UE COOP_V9, 3rd Generation Partnership Project, Mobile Competence Centre, 650, Route Des Lucioles, F-06921 Sophia-Antipolis Cedex, France, vol. TSG RAN, No. Shenzhen, China, Mar. 18, 2019-Mar. 21, 2019, 4 Pages, Mar. 11, 2019, XP051690378, The whole document.
Supplementary European Search Report—EP21936454—Search Authority—The Hague—Nov. 29, 2024 (2103022EP).
Woasis: "Type-I Relay with SVD-Based Joint Transmission", 3GPP TSG RAN WG1 Melting #59bis, R1-100469, 3rd Generation Partnership Project, Mobile Competence Centre, 650, Route Des Lucioles, F-06921 Sophia-Antipolis Cedex, France, vol. RAN WG1, No. Valencia, Spain, Jan. 18, 2010-Jan. 22, 2010, pp. 1-4, Jan. 12, 2010, XP050597957, The whole document.

* cited by examiner

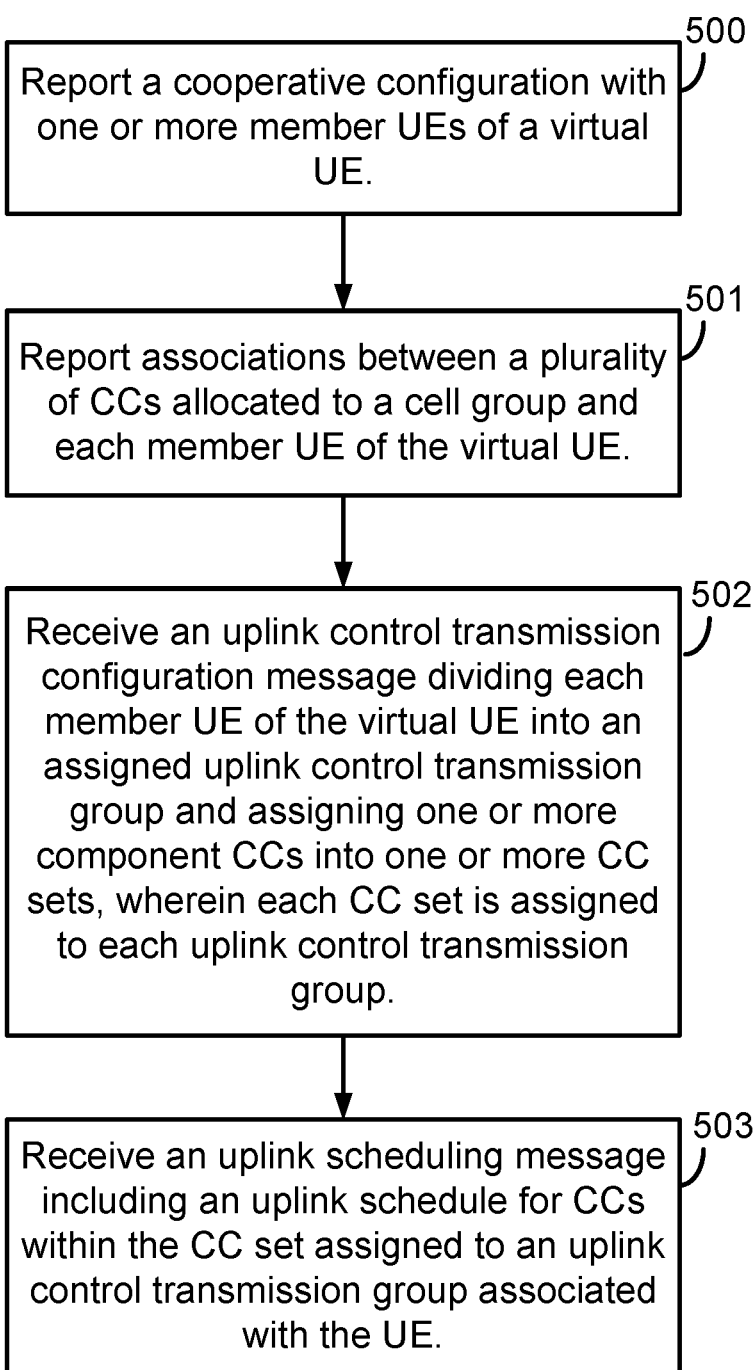

_500_

Report a cooperative configuration with one or more member UEs of a virtual UE.

_501_

Report associations between a plurality of CCs allocated to a cell group and each member UE of the virtual UE.

_502_

Receive an uplink control transmission configuration message dividing each member UE of the virtual UE into an assigned uplink control transmission group and assigning one or more component CCs into one or more CC sets, wherein each CC set is assigned to each uplink control transmission group.

_503_

Receive an uplink scheduling message including an uplink schedule for CCs within the CC set assigned to an uplink control transmission group associated with the UE.

*FIG. 5A*

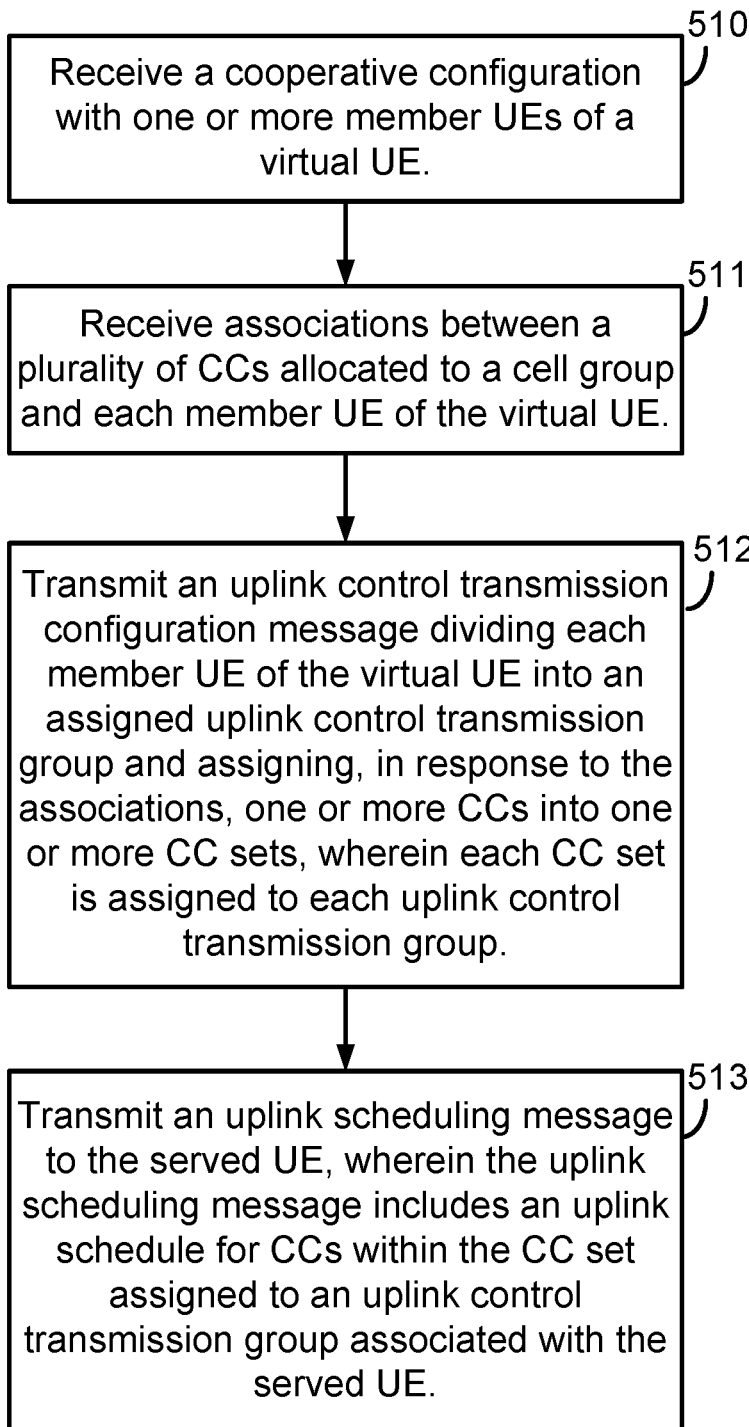

510

Receive a cooperative configuration with one or more member UEs of a virtual UE.

511

Receive associations between a plurality of CCs allocated to a cell group and each member UE of the virtual UE.

512

Transmit an uplink control transmission configuration message dividing each member UE of the virtual UE into an assigned uplink control transmission group and assigning, in response to the associations, one or more CCs into one or more CC sets, wherein each CC set is assigned to each uplink control transmission group.

513

Transmit an uplink scheduling message to the served UE, wherein the uplink scheduling message includes an uplink schedule for CCs within the CC set assigned to an uplink control transmission group associated with the served UE.

*FIG. 5B*

UPLINK CONTROL CHANNEL GROUP AND CROSS-CARRIER SCHEDULING FOR USER EQUIPMENT COOPERATION

TECHNICAL FIELD

Aspects of the present disclosure relate generally to wireless communication systems, and more particularly, to wireless communications with cooperative user equipment (UE) capabilities. Some features may enable and provide improved communications, including uplink control channel group and cross-carrier scheduling for cooperative communications of member UEs of a virtual UE.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks may be multiple access networks that support communications for multiple users by sharing the available network resources.

A wireless communication network may include several components. These components may include wireless communication devices, such as base stations (or node Bs) that may support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on a downlink to a UE or may receive data and control information on an uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication includes reporting, by the UE to a serving base station, a cooperative configuration with one or more member UEs of a virtual UE, reporting, by the UE to the serving base station, associations between a plurality of component carriers (CCs) allocated to a cell group and each member UE of the virtual UE, receiving, by the UE, an uplink control transmission configuration message dividing the each member UE of the virtual UE into an assigned uplink control transmission group of a plurality of uplink control transmission groups and assigning one or more component CCs of the plurality of CCs into one or more CC sets, wherein each CC set of the one or more CC sets is assigned to each uplink control transmission group of the plurality of uplink control transmission groups, and receiving, by the UE, an uplink scheduling message from the serving base station, wherein the uplink scheduling message includes an uplink schedule for CCs within the CC set assigned to an uplink control transmission group associated with the UE.

In an additional aspect of the disclosure, a method of wireless communication includes receiving, by the base station from a served UE, a cooperative configuration with one or more member UEs of a virtual UE, receiving, by the base station from the served UE, associations between a plurality of CCs allocated to a cell group and each member UE of the virtual UE, transmitting, by the base station, an uplink control transmission configuration message dividing the each member UE of the virtual UE into an assigned uplink control transmission group of a plurality of uplink control transmission groups and assigning, in response to the associations, one or more component CCs of the plurality of CCs into one or more CC sets, wherein each CC set of the one or more CC sets is assigned to each uplink control transmission group of the plurality of uplink control transmission groups, and transmitting, by the base station, an uplink scheduling message to the served UE, wherein the uplink scheduling message includes an uplink schedule for CCs within the CC set assigned to an uplink control transmission group associated with the served UE.

In an additional aspect of the disclosure, a UE configured for wireless communication is disclosed. The apparatus includes at least one processor, and a memory coupled to the at least one processor. The at least one processor is configured to report, by the UE to a serving base station, a cooperative configuration with one or more member UEs of a virtual UE, to report, by the UE to the serving base station, associations between a plurality of CCs allocated to a cell group and each member UE of the virtual UE, to receive, by the UE, an uplink control transmission configuration message dividing the each member UE of the virtual UE into an assigned uplink control transmission group of a plurality of uplink control transmission groups and assigning one or more component CCs of the plurality of CCs into one or more CC sets, wherein each CC set of the one or more CC sets is assigned to each uplink control transmission group of the plurality of uplink control transmission groups, and to receive, by the UE, an uplink scheduling message from the serving base station, wherein the uplink scheduling message includes an uplink schedule for CCs within the CC set assigned to an uplink control transmission group associated with the UE.

In an additional aspect of the disclosure, base station configured for wireless communication is disclosed. The base station includes at least one processor, and a memory coupled to the at least one processor. The at least one processor is configured to receive, by the base station from a served UE, a cooperative configuration with one or more member UEs of a virtual UE, to receive, by the base station from the served UE, associations between a plurality of CCs allocated to a cell group and each member UE of the virtual UE, to transmit, by the base station, an uplink control transmission configuration message dividing the each member UE of the virtual UE into an assigned uplink control transmission group of a plurality of uplink control transmission groups and assigning, in response to the associations, one or more component CCs of the plurality of CCs into one or more CC sets, wherein each CC set of the one or more CC sets is assigned to each uplink control transmission group of the plurality of uplink control transmission groups, and to transmit, by the base station, an uplink scheduling message to the served UE, wherein the uplink scheduling message includes an uplink schedule for CCs within the CC set assigned to an uplink control transmission group associated with the served UE.

In an additional aspect of the disclosure, a UE configured for wireless communication is disclosed. The apparatus includes means for reporting, by the UE to a serving base station, a cooperative configuration with one or more member UEs of a virtual UE, means for reporting, by the UE to the serving base station, associations between a plurality of CCs allocated to a cell group and each member UE of the virtual UE, means for receiving, by the UE, an uplink control transmission configuration message dividing the each member UE of the virtual UE into an assigned uplink control transmission group of a plurality of uplink control transmission groups and assigning one or more component CCs of the plurality of CCs into one or more CC sets, wherein each CC set of the one or more CC sets is assigned to each uplink control transmission group of the plurality of uplink control transmission groups, and means for receiving, by the UE, an uplink scheduling message from the serving base station, wherein the uplink scheduling message includes an uplink schedule for CCs within the CC set assigned to an uplink control transmission group associated with the UE.

In an additional aspect of the disclosure, a base station configured for wireless communication is disclosed. The apparatus includes means for receiving, by the base station from a served UE, a cooperative configuration with one or more member UEs of a virtual UE, means for receiving, by the base station from the served UE, associations between a plurality of CCs allocated to a cell group and each member UE of the virtual UE, means for transmitting, by the base station, an uplink control transmission configuration message dividing the each member UE of the virtual UE into an assigned uplink control transmission group of a plurality of uplink control transmission groups and assigning, in response to the associations, one or more component CCs of the plurality of CCs into one or more CC sets, wherein each CC set of the one or more CC sets is assigned to each uplink control transmission group of the plurality of uplink control transmission groups, and means for transmitting, by the base station, an uplink scheduling message to the served UE, wherein the uplink scheduling message includes an uplink schedule for CCs within the CC set assigned to an uplink control transmission group associated with the served UE.

In an additional aspect of the disclosure, a non-transitory computer-readable medium stores instructions that, when executed by a processor, cause the processor to perform operations including reporting, by the UE to a serving base station, a cooperative configuration with one or more member UEs of a virtual UE, reporting, by the UE to the serving base station, associations between a plurality of CCs allocated to a cell group and each member UE of the virtual UE, receiving, by the UE, an uplink control transmission configuration message dividing the each member UE of the virtual UE into an assigned uplink control transmission group of a plurality of uplink control transmission groups and assigning one or more component CCs of the plurality of CCs into one or more CC sets, wherein each CC set of the one or more CC sets is assigned to each uplink control transmission group of the plurality of uplink control transmission groups, and receiving, by the UE, an uplink scheduling message from the serving base station, wherein the uplink scheduling message includes an uplink schedule for CCs within the CC set assigned to an uplink control transmission group associated with the UE.

In an additional aspect of the disclosure, a non-transitory computer-readable medium stores instructions that, when executed by a processor, cause the processor to perform operations including receiving, by the base station from a served UE, a cooperative configuration with one or more member UEs of a virtual UE, receiving, by the base station from the served UE, associations between a plurality of CCs allocated to a cell group and each member UE of the virtual UE, transmitting, by the base station, an uplink control transmission configuration message dividing the each member UE of the virtual UE into an assigned uplink control transmission group of a plurality of uplink control transmission groups and assigning, in response to the associations, one or more component CCs of the plurality of CCs into one or more CC sets, wherein each CC set of the one or more CC sets is assigned to each uplink control transmission group of the plurality of uplink control transmission groups, and transmitting, by the base station, an uplink scheduling message to the served UE, wherein the uplink scheduling message includes an uplink schedule for CCs within the CC set assigned to an uplink control transmission group associated with the served UE.

Other aspects, features, and implementations will become apparent to those of ordinary skill in the art, upon reviewing the following description of specific, exemplary aspects in conjunction with the accompanying figures. While features may be discussed relative to certain aspects and figures below, various aspects may include one or more of the advantageous features discussed herein. In other words, while one or more aspects may be discussed as having certain advantageous features, one or more of such features may also be used in accordance with the various aspects. In similar fashion, while exemplary aspects may be discussed below as device, system, or method aspects, the exemplary aspects may be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

5

Figure 2:
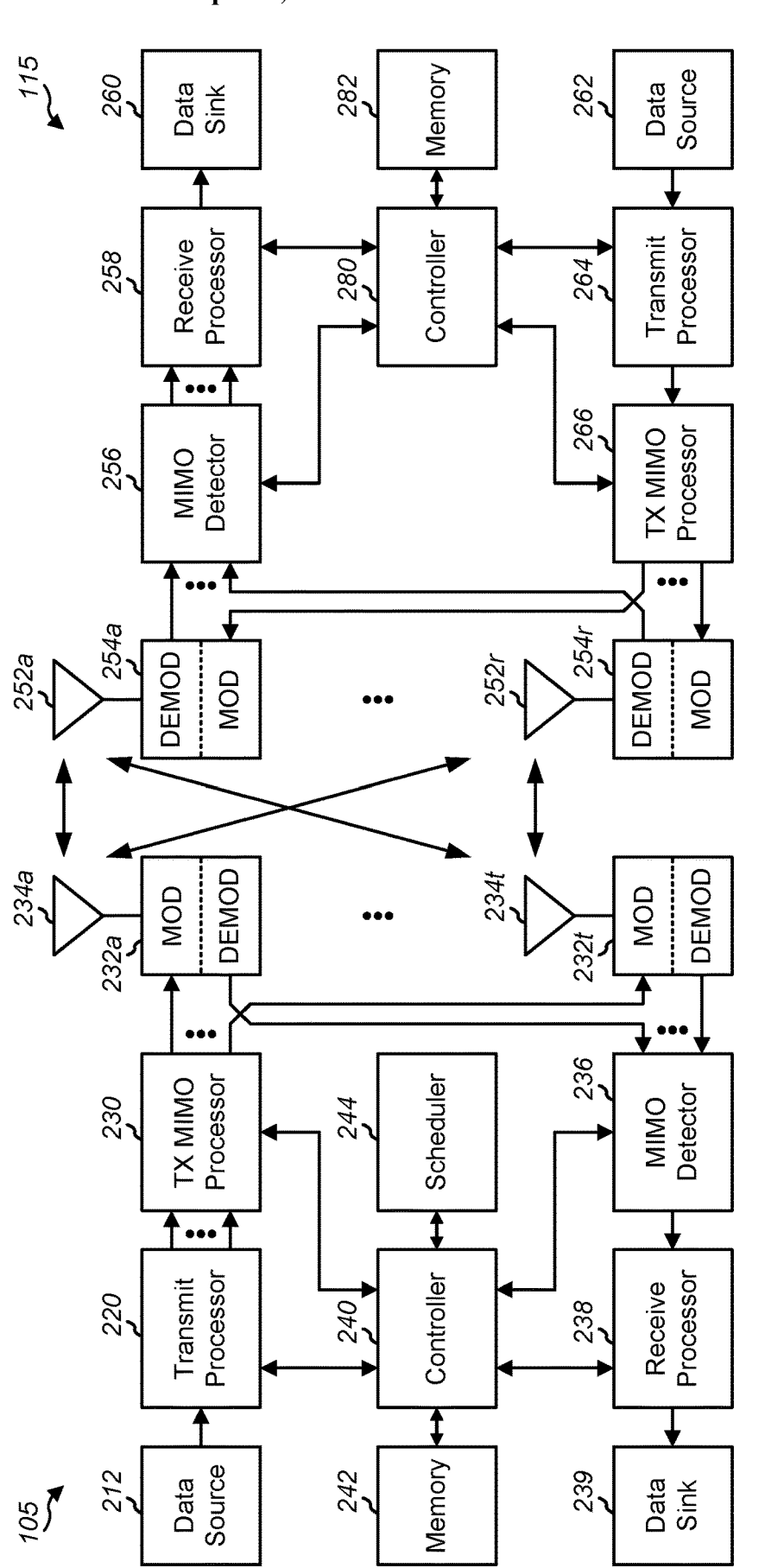

FIG. 2 is a block diagram illustrating examples of a base station and a user equipment (UE) according to one or more aspects.

Figure 3:
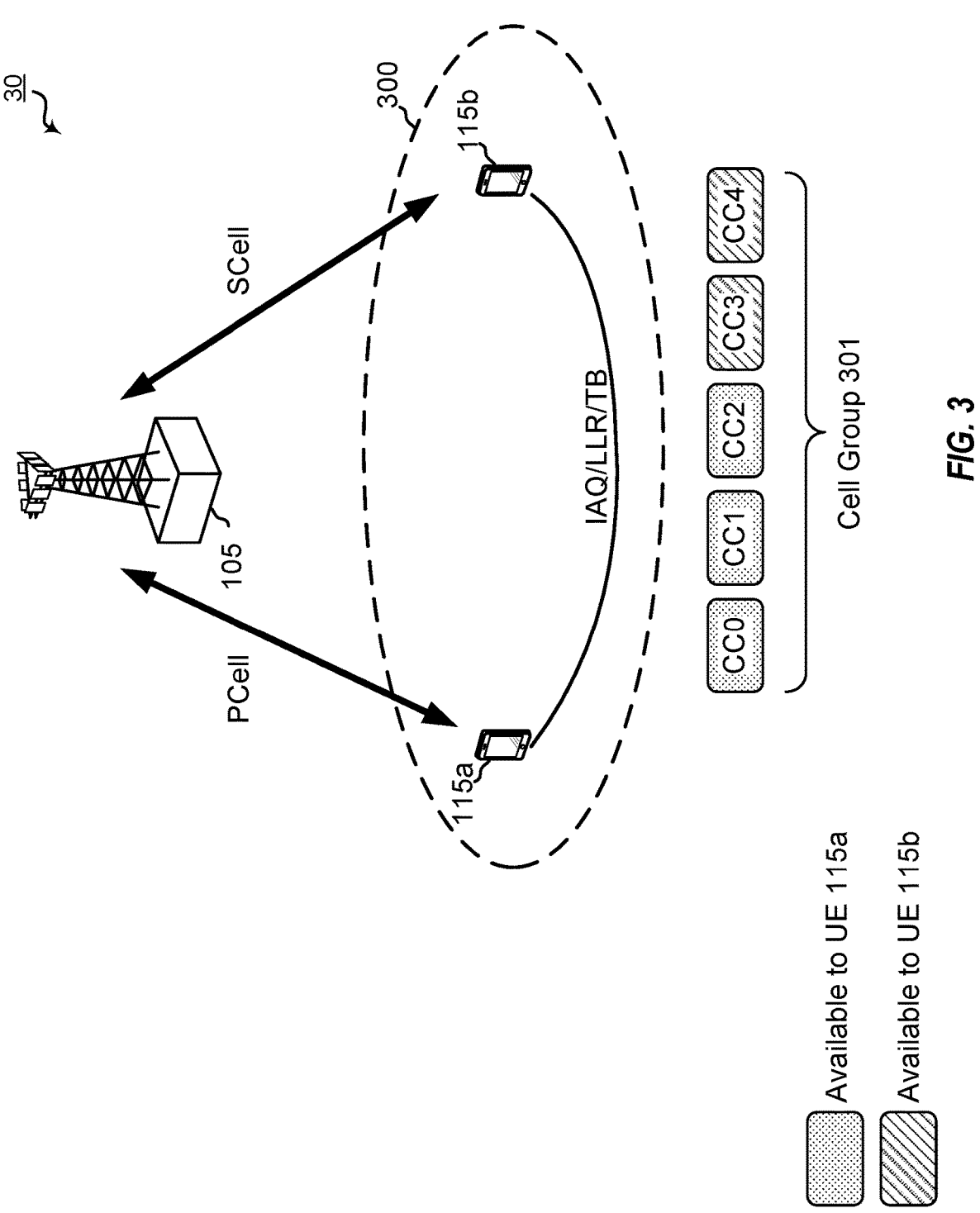

FIG. 3 is a block diagram illustrating a wireless network configured for communication between a base station and a virtual UE made up of member UEs.

Figure 4:
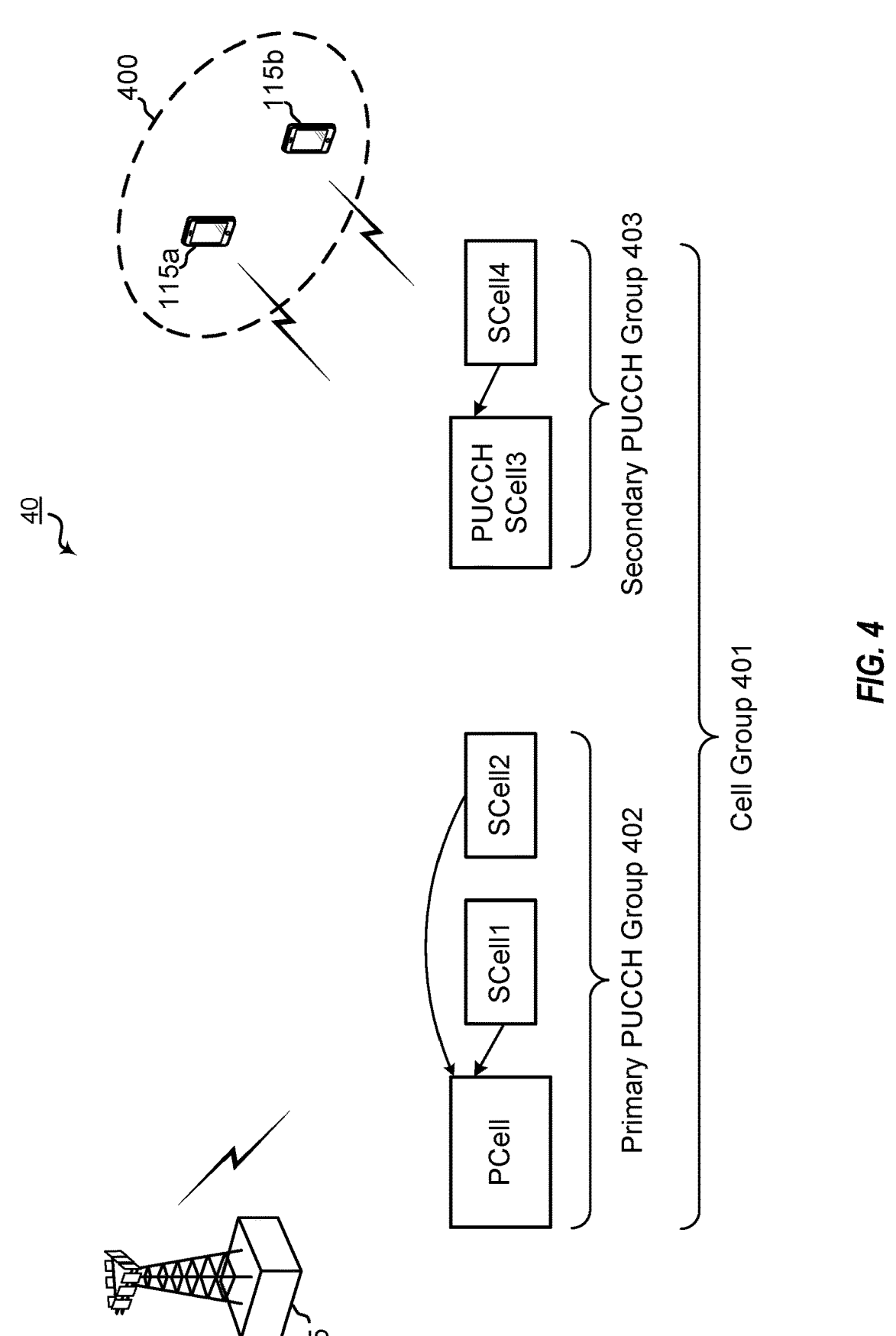

FIG. 4 is a block diagram illustrating a wireless network configured for communication between a base station and a virtual UE made up of member UEs.

FIGS. 5A-5B are block diagrams illustrating example blocks executed to implement uplink control channel group and cross-carrier scheduling for cooperative communications of member UEs of a virtual UE according to one aspect of the present disclosure.

Figure 6A:
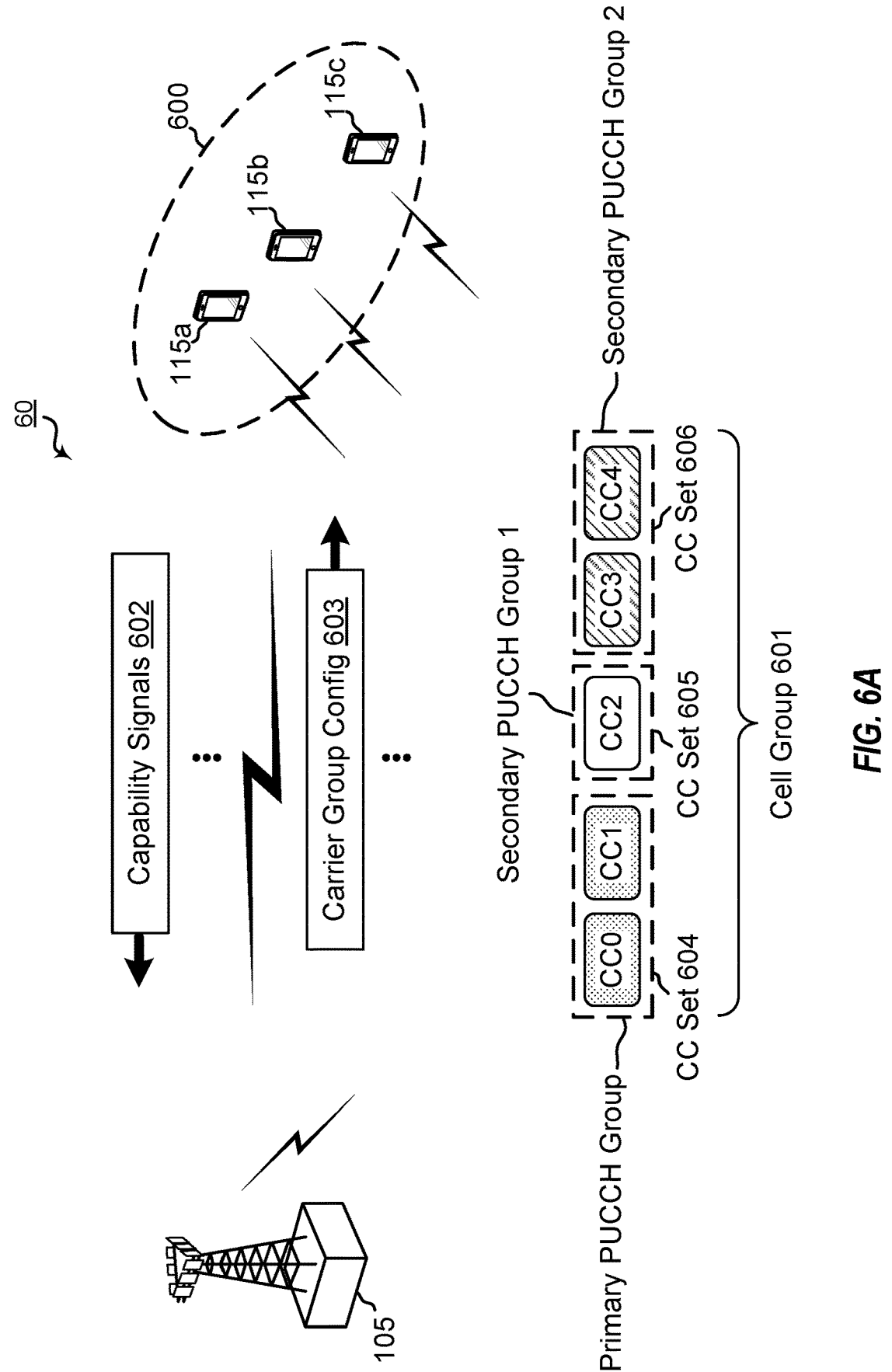
Figure 6B:
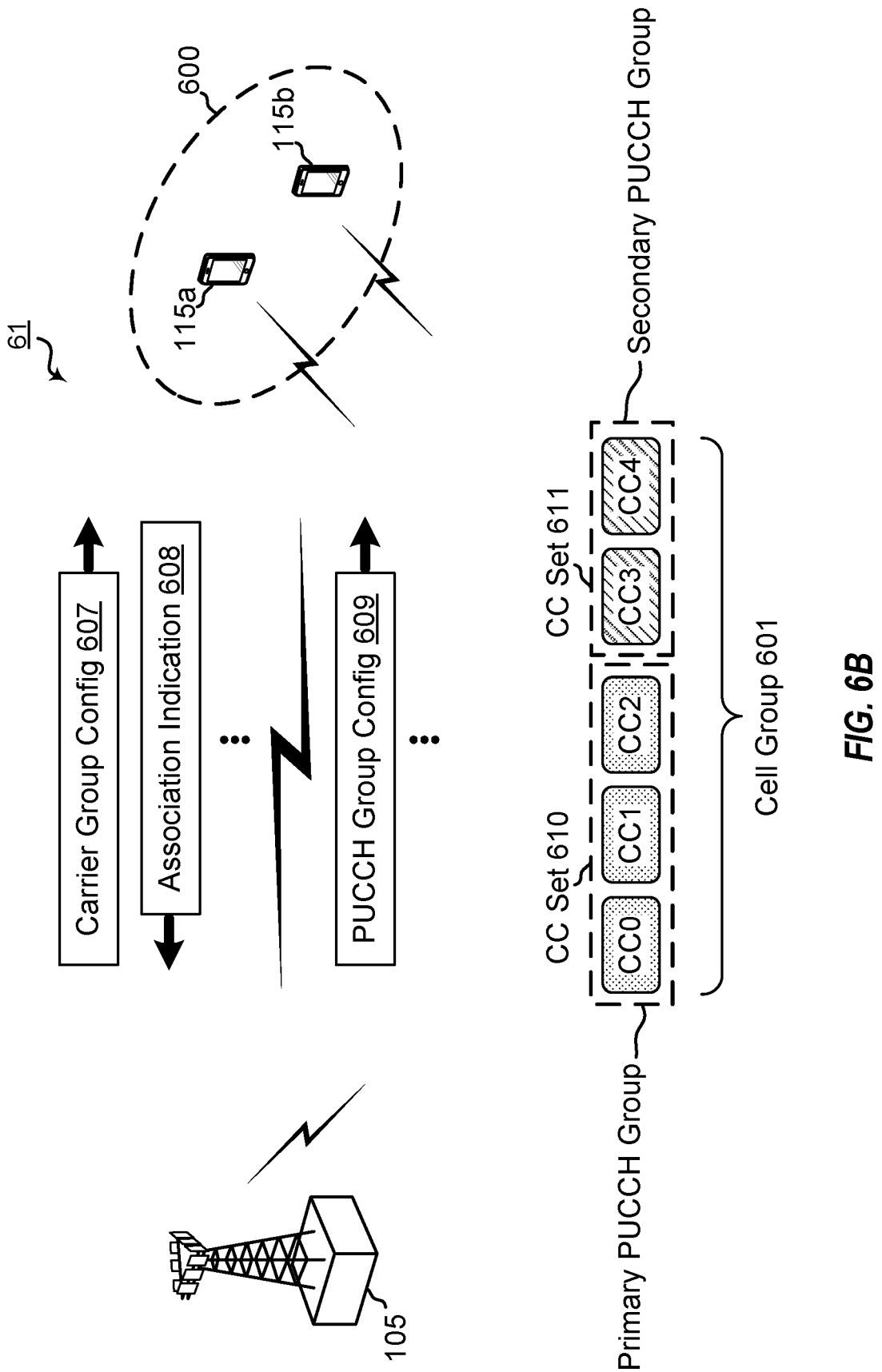

FIGS. 6A-6B are block diagrams illustrating a wireless network including a base station and member UEs cooperatively communicating as a virtual UE and configured to provide uplink control channel group and cross-carrier scheduling for cooperative communications of member UEs of a virtual UE according to aspects of the present disclosure.

Figure 7:
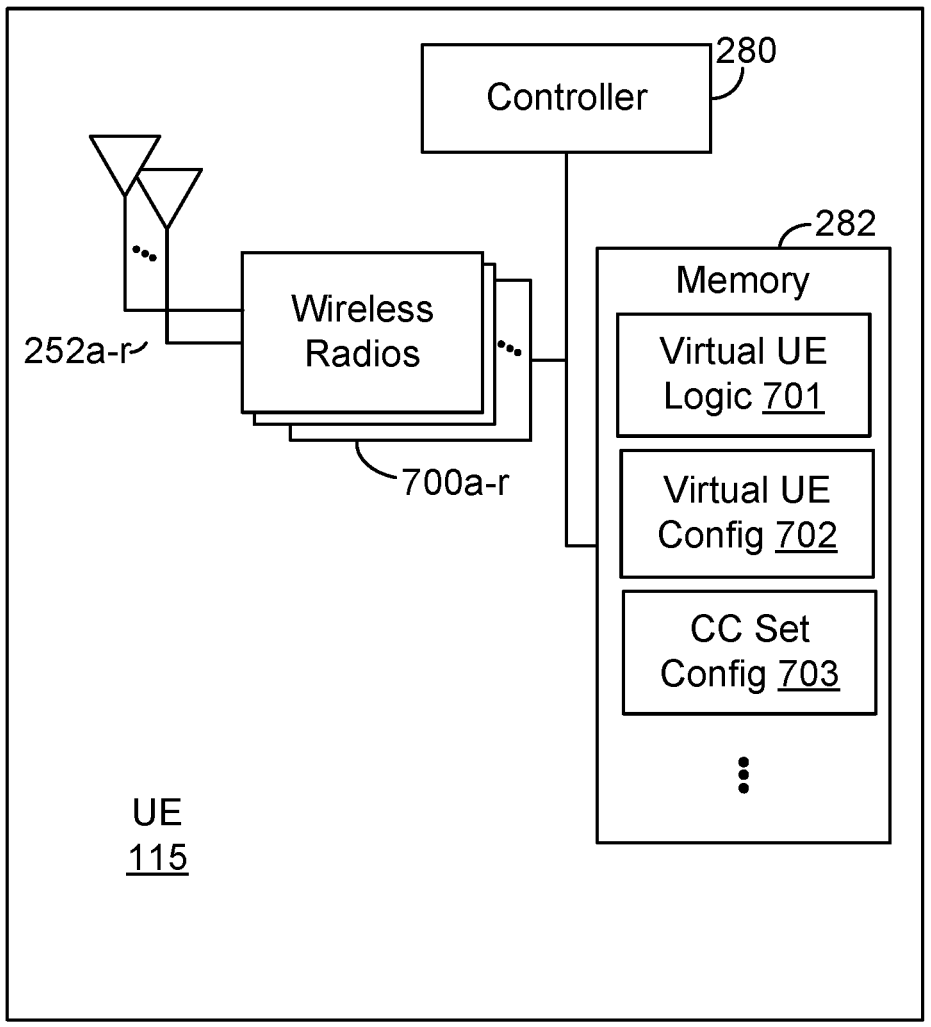

FIG. 7 is a flow diagram illustrating an example process that supports uplink control channel group and cross-carrier scheduling for cooperative communications of member UEs of a virtual UE according to one or more aspects.

Figure 8:
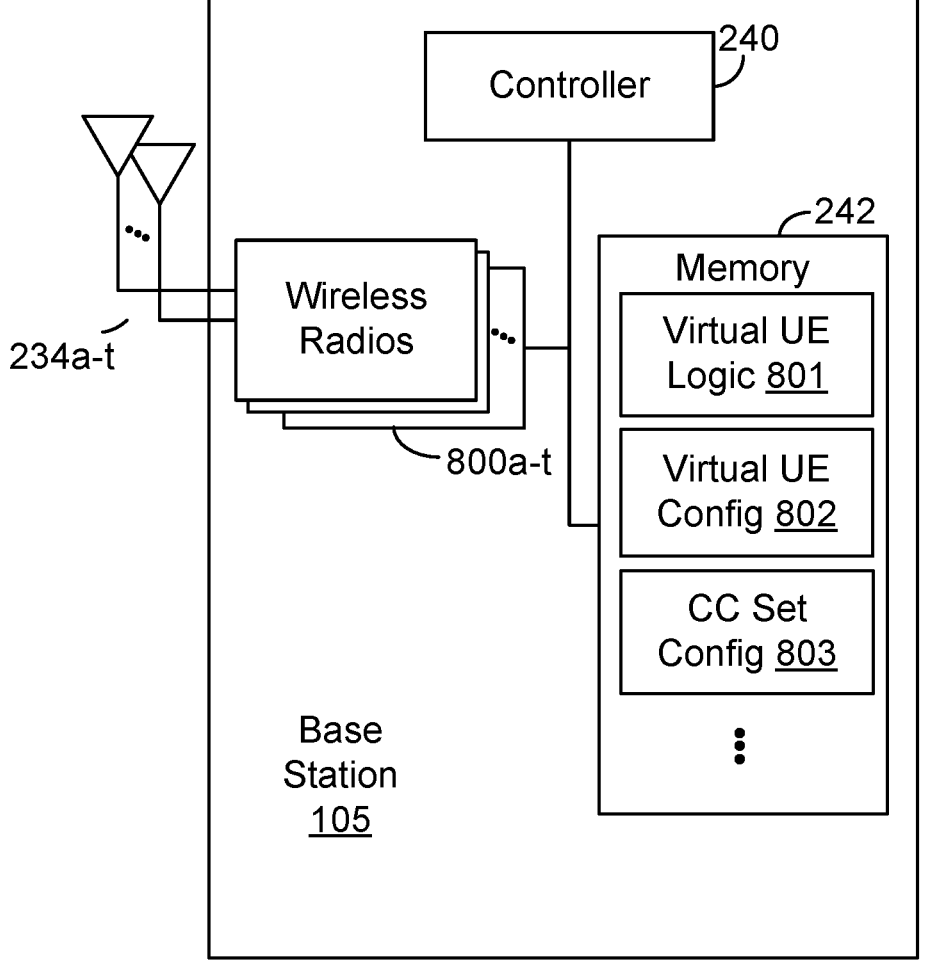

FIG. 8 is a block diagram of an example base station that supports uplink control channel group and cross-carrier scheduling for cooperative communications of member UEs of a virtual UE according to one or more aspects.

Like reference numbers and designations in the various drawings indicate like elements.

DETAILED DESCRIPTION

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The present disclosure provides systems, apparatus, methods, and computer-readable media that support uplink control channel group and cross-carrier scheduling for cooperative communications of member UEs of a virtual UE. In one aspect of the present disclosure, a UE reports a cooperative configuration with member UEs of a virtual UE and reports associations between a plurality of component carriers (CCs) allocated to a cell group and each member UE of the virtual UE. The UE may receive an uplink control transmission configuration message dividing each member UE into an assigned uplink control transmission group and assign one or more component CCs into one or more CC sets, wherein each CC set is assigned to a corresponding one of each uplink control transmission group. The UE may receive an uplink scheduling message from a serving base station, wherein the uplink scheduling message includes an uplink schedule for CCs within the CC set assigned to an uplink control transmission group associated with the UE.

Particular implementations of the subject matter described in this disclosure may be implemented to realize one or more of the following potential advantages or benefits. In some aspects, the present disclosure provides techniques for control channel group and cross-carrier scheduling for cooperative communications of member UEs of a virtual UE. By assigning the allocated CCs into CC sets that are associated with the members of the same uplink control transmission group, acknowledgement signaling may be reported by the member UEs associated with the same uplink control transmission group without waiting for the decoding and UE-to-UE communication from member UEs that belong to a different uplink control transmission group. Additionally, a scheduling member UE of a first uplink control transmission group will not attempt cross-carrier scheduling of any non-scheduling member UE that does not also belong to the first uplink control transmission group.

This disclosure relates generally to providing or participating in authorized shared access between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5$^{th}$ Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. Additionally, an operator network may also include one or more LTE networks, or one or more other networks. The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP LTE is a 3GPP project which was aimed at improving UMTS mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 millisecond (ms)), and users with wide ranges of mobility or lack thereof, and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHz-300 GHz) which is identified by the International Telecommunications Union (ITU) as a "mmWave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of subcarrier spacing, may efficiently address operating diverse services across diverse spectrum and diverse deployments.

For example, in various outdoor and macro coverage deployments of less than 3 GHz FDD or TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

Figure 1:
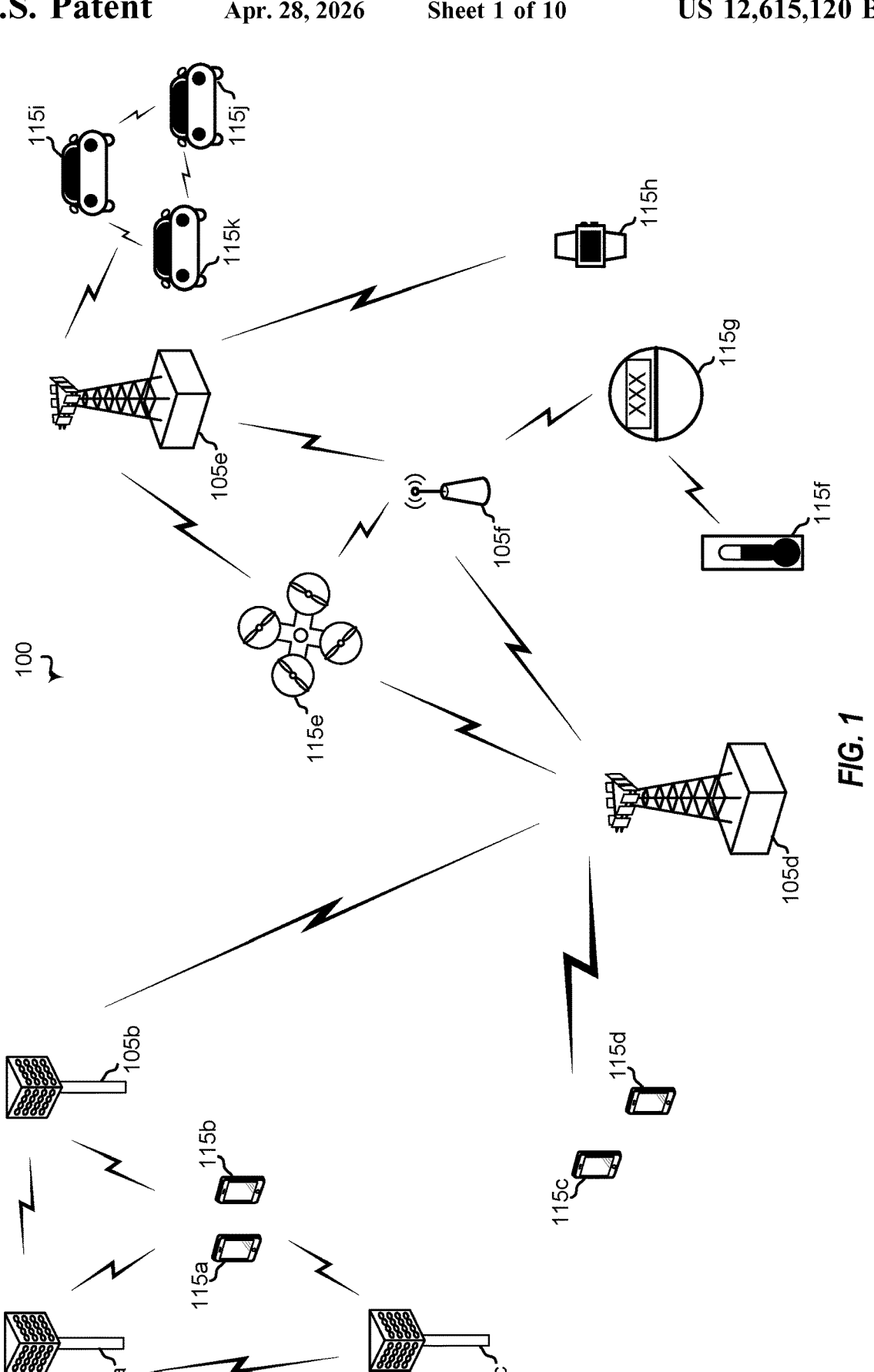
FIG. 1 is a block diagram illustrating example details of an example wireless communication system according to one or more aspects.

FIG. 1 is a block diagram illustrating details of an example wireless communication system according to one or more aspects. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" may refer to this particular geographic coverage area of a base station or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an IoT or "Internet of everything" (IoE) device such as an automotive or other transportation vehicle, a satellite radio, a global positioning system (GPS) device, a global navigation satellite system (GNSS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 100 may occur using wired or wireless communication links.

In operation at wireless network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD communications or low-latency FDD communications, such as in a vehicle-to-vehicle (V2V) mesh network between UEs 115i-115k communicating with macro base station 105e.

FIG. 2 is a block diagram illustrating examples of base station 105 and UE 115 according to one or more aspects. Base station 105 and UE 115 may be any of the base stations and one of the UEs in FIG. 1. For a restricted association scenario (as mentioned above), base station 105 may be small cell base station 105f in FIG. 1, and UE 115 may be UE 115c or 115d operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At base station 105, transmit processor 220 may receive data from data source 212 and control information from controller 240, such as a processor. The control information may be for a physical broadcast channel (PBCH), a physical control format indicator channel (PCFICH), a physical hybrid-ARQ (automatic repeat request) indicator channel (PHICH), a physical downlink control channel (PDCCH), an enhanced physical downlink control channel (EPDCCH), an MTC physical downlink control channel (MPDCCH), etc. The data may be for a physical downlink shared channel (PDSCH), etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) MIMO processor 230 may perform spatial processing (e.g., precoding) on the data symbols, the control symbols, or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, antennas 252a through 252r may receive the downlink signals from base station 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller 280, such as a processor.

On the uplink, at UE 115, transmit processor 264 may receive and process data (e.g., for a physical uplink shared channel (PUSCH)) from data source 262 and control information (e.g., for a physical uplink control channel (PUCCH)) from controller 280. Additionally, transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to controller 240.

Controllers 240 and 280 may direct the operation at base station 105 and UE 115, respectively. Controller 240 or other processors and modules at base station 105 or controller 280 or other processors and modules at UE 115 may perform or direct the execution of various processes for the techniques described herein, such as to perform or direct the execution illustrated in FIGS. 5A and 5B, or other processes for the techniques described herein. Memories 242 and 282 may store data and program codes for base station 105 and UE 115, respectively. Scheduler 244 may schedule UEs for data transmission on the downlink or the uplink.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel or the acknowledge/negative-acknowledge (ACK/NACK) feedback for its own transmitted packets as a proxy for collisions.

In general, four categories of LBT procedure have been suggested for sensing a shared channel for signals that may indicate the channel is already occupied. In a first category (CAT 1 LBT), no LBT or CCA is applied to detect occupancy of the shared channel. A second category (CAT 2 LBT), which may also be referred to as an abbreviated LBT, a single-shot LBT, a 16-µs, or a 25-µs LBT, provides for the node to perform a CCA to detect energy above a predetermined threshold or detect a message or preamble occupying the shared channel. The CAT 2 LBT performs the CCA without using a random back-off operation, which results in its abbreviated length, relative to the next categories.

A third category (CAT 3 LBT) performs CCA to detect energy or messages on a shared channel, but also uses a random back-off and fixed contention window. Therefore, when the node initiates the CAT 3 LBT, it performs a first CCA to detect occupancy of the shared channel. If the shared channel is idle for the duration of the first CCA, the node may proceed to transmit. However, if the first CCA detects a signal occupying the shared channel, the node selects a random back-off based on the fixed contention window size and performs an extended CCA. If the shared channel is detected to be idle during the extended CCA and the random number has been decremented to 0, then the node may begin transmission on the shared channel. Otherwise, the node decrements the random number and performs another extended CCA. The node would continue performing extended CCA until the random number reaches 0. If the random number reaches 0 without any of the extended CCAs detecting channel occupancy, the node may then transmit on the shared channel. If at any of the extended CCA, the node detects channel occupancy, the node may re-select a new random back-off based on the fixed contention window size to begin the countdown again.

A fourth category (CAT 4 LBT), which may also be referred to as a full LBT procedure, performs the CCA with energy or message detection using a random back-off and variable contention window size. The sequence of CCA detection proceeds similarly to the process of the CAT 3 LBT, except that the contention window size is variable for the CAT 4 LBT procedure.

Sensing for shared channel access may also be categorized into either full-blown or abbreviated types of LBT procedures. For example, a full LBT procedure, such as a CAT 3 or CAT 4 LBT procedure, including extended channel clearance assessment (ECCA) over a non-trivial number of 9-µs slots, may also be referred to as a "Type 1 LBT." An abbreviated LBT procedure, such as a CAT 2 LBT procedure, which may include a one-shot CCA for 16-µs or 25-µs, may also be referred to as a "Type 2 LBT."

Use of a medium-sensing procedure to contend for access to an unlicensed shared spectrum may result in communication inefficiencies. This may be particularly evident when multiple network operating entities (e.g., network operators) are attempting to access a shared resource. In wireless communications system 100, base stations 105 and UEs 115 may be operated by the same or different network operating entities. In some examples, an individual base station 105 or UE 115 may be operated by more than one network operating entity. In other examples, each base station 105 and UE 115 may be operated by a single network operating entity. Requiring each base station 105 and UE 115 of different network operating entities to contend for shared resources may result in increased signaling overhead and communication latency.

In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In the form factor of a typical UE, with a limited number of antennas, the baseband modem capabilities may often provide higher processing capabilities than the RF capabilities. The use of UE relays, which may allow cooperative communications between multiple UEs and a serving base station, may allow for the creation of a "virtual UE" that effectively results in a larger effective number of antennas, which can be exploited to increase user experience over the cellular network. The formation of a virtual UE with multiple of the "member" UEs may also result in creation of a virtual MIMO effect including the larger effective number of antennas of the virtual UE. The higher RF capabilities resulting from the larger effective number of antennas of the virtual UE can also provide benefits for sub 7 GHz bands, as well as in the mmW bands. From the network point of view, it is the virtual UE that is being served, in which the member UEs represent distributed panels or distributed set of antennas for the virtual UE. The data transmitted by the network to the virtual UE will be communicated to the target UE via UE-to-UE communication from the other member UEs.

A virtual UE may be configured either to have shared baseband processing or separate baseband processing. In a shared baseband processing, the non-target member UEs receive the data transmission from the network, decodes the transmission, but then transmit an encoded version of the received transmission to the target UE. The target UE will decode the data transmission that it receives from the network and also decode the encoded data transmissions that were received from the other member UEs. In a separate baseband processing configuration, the non-target member UEs receive the data transmission from the network, decode the data from the transmission, and then transmits the decoded data to the target UE.

Thus, in the separate baseband processing configuration, the target UE will receive the transmitted data from the other member UEs are able to decode the transmission.

FIG. 3 is a block diagram illustrating a wireless network 30 configured for communication between a base station 105 and a virtual UE 300 made up of member UEs, UEs 115a-115b. In order to form virtual UE 300 with joint baseband processing across distributed antennas from different individual member UEs, UEs 115a-115b, that belong to virtual UE 300, member UEs within virtual UE 300 may communicate information regarding received signaling to the primary or target UE, UE 115a, of virtual UE 300. Such information may be referred to herein as cooperative process data. In one example, cooperative process data may be configured for an in-phase and quadrature (IAQ) exchange where a secondary UE, UE 115b, of virtual UE 300 transmits the received signals, before or after applying a transform (e.g., fast Fourier transform (FFT)), but before demodulation or de-mapping, to primary UE 115a. Primary UE 115a may then perform joint demodulation or demapping and decoding. Alternatively, cooperative process data may be configured as a log-likelihood ratio (LLR) exchange where secondary UE 115b transmits LLR values after demodulation or demapping of the received signals to primary UE 115a. Primary UE 115a may then perform joint decoding using the LLR values from secondary UE 115b.

Alternatively, virtual UE 300 may be formed with separate BB processing across UEs 115a-115b. In such separate BB processing, base station 105 sends a cooperative transmission of a TB to primary UE 115a and secondary UE 115b. Secondary UE 115b, after decoding the TB, will transmits an encoded copy of the decoded TB to primary UE 115a. Primary UE 115a may then separately decodes both TBs received from base station 105 and from secondary UE 115b.

Further alternatively, virtual UE 300 may be formed with separate BB processing across UEs 115a-115b. In such separate BB processing, base station 105 sends a cooperative transmission of a TB to primary UE 115a and secondary UE 115b. Secondary UE 115b, after decoding the TB, will transmits an encoded copy of the decoded TB to primary UE 115a. Primary UE 115a may then separately decodes both TBs received from base station 105 and from secondary UE 115b.

It should be noted that the communication of the cooperative process data between UE 115a and 115b of virtual UE 300 may occur using various technologies, such as via a sidelink transmission, shorter-range wireless technology (e.g., WiFi™, Bluetooth™, Zigbee™, etc.). The various aspects of the present disclosure may be applicable to cooperative UE operations which use any variety of UE-to-UE communication methods.

Carrier aggregation has been suggested for 5G NR virtual UE operations, such as virtual UE 300 within wireless network 30. The members UEs, (member UEs 115a and 115b) comprising virtual UE 300 may include one target member UE (e.g., member UE 115a), to which downlink data is ultimately directed, and one or more cooperative member UEs (e.g., member UE 115b), which cooperate with the target member UE as virtual UE 300. Cell group 301 is allocated to virtual UE 300 include CC0-CC4. The resources available for communications with the target member UE, member UE 115a, CC0-CC2, may be considered the primary cell (PCell) of cell group 301, while the resources available for communications with the cooperative member UE, member UE 115b, CC3-CC4, may be considered the secondary cell (SCell) of cell group 301. In implementing virtual UE 300, separate downlink and uplink transmissions (e.g., PDSCH and PUSCH) provide for the exchange of transport blocks (TBs) over UE-to-UE communication, where downlink data corresponding to the downlink transmissions received by the cooperative member UEs (member UE 115b) on the SCell may be delivered to the target member UE (member UE 115a) on the PCell, and uplink data corresponding to the uplink transmissions transmitted by the cooperative member UE (member UE 115b) on the SCell would be delivered to member UE 115b in advance of the uplink transmission.

FIG. 4 is a block diagram illustrating a wireless network 40 configured for communication between a base station 105 and a virtual UE 400 made up of member UEs, UEs 115a-115b. Cell group 400 includes multiple CCs configured for carrier aggregation within cell group 400. Currently, a cell group configured for carrier aggregation may be configured to include up to two uplink control transmission groups (e.g., PUCCH groups). As a default carrier aggregation operation, the uplink control transmissions of all cells within a cell group, such as cell group 400, may be transmitted on the PCell of that cell group (one PUCCH group). Optionally, UE capability may allow for configuration of up to two uplink control transmission groups.

Virtual UE 400, including member UEs 115a and 115b, is configured with two uplink control transmission groups, primary PUCCH group 402, including the PCell, SCell1, and SCell2, and secondary PUCCH group 403, including SCell3 and SCell4, defined with cell group 400. The acknowledgement signaling conducted via uplink control transmission may include construction of acknowledgement codebook and reporting that is performed separately across each of primary PUCCH group 402 and secondary PUCCH group 403. Acknowledgement signaling for downlink transmissions received in downlink CCs of primary PUCCH group 402 by PCell, SCell1, and SCell2, may be transmitted over the PCell. Acknowledgement signaling for downlink transmissions received in downlink CCs of secondary PUCCH group 403 by SCell3 and SCell4 are sent on the PUCCH-SCell3. The cell designated for uplink control transmissions for each downlink CC may be configured as a part of a configuration message configuring the serving cell for downlink transmissions. The configuration message may identify the serving cell index that should carry the uplink control transmissions for this serving cell. If identification of such index is absent from such a configuration message or is not configured, then the member UE, member UEs 115a and 115b, may send acknowledgement signaling on the uplink control transmissions of the PCell or on the uplink control transmission of the serving cell if it is an SCell that is configured with a PUCCH.

In the case of cross-carrier scheduling, a downlink control information (DCI) message received on a scheduling cell may schedule a different cell (referred to as a "scheduled cell"). The scheduling CC can schedule both downlink and uplink transmissions on the scheduled CC. A carrier indicator field (CIF) in the DCI message may be used to indicate the scheduled CC. The CIF may be configured with either 0-bits or 3-bits. When 0-bits is configured, the scheduling cell will perform self-scheduling and not scheduling of any other carriers, and when 3-bits is configured, the scheduling cell may schedule itself and other carriers.

In the case of virtual UEs having multiple, cooperating member UEs using a carrier aggregation framework, certain operations may rely on a fast UE-to-UE communication link, which may not be practically available in many cases, for completing communications without substantial delay. For example, where a first CC is associated with a first member UE (first antenna panel or set of antennas) of the virtual UE and another CC is associated with another member UE (another antenna panel or another set of antennas) of the virtual UE both belong to the same uplink control transmission group (e.g., a PUCCH group), both acknowledgement codebook construction and reporting of acknowledgement status would occur jointly across both CCs, which are associated with different member UEs (different antenna panels or sets of antennas). In order to exchange information on such codebook construction and reporting of an acknowledgment state, the communication link between these different member UE will create a delay in communications should it not be an ideal, fast link.

In an alternative example, a first CC associated with one member UE of a virtual UE may carry transmissions that schedule a second CC associated with a second member UE. Because the second CC is cross-carrier scheduled via the first CC, this implies that the DCI that schedules the uplink or downlink transmissions for the second member UE would first be decoded by the first member UE, and the first member UE would then transmit the decoded DCI payload to the second member UE before the second member UE can receive the scheduled downlink transmission or transmit the scheduled uplink transmission.

FIG. 5A is a block diagram illustrating example blocks executed by a member UE of a virtual UE to implement uplink control channel group and cross-carrier scheduling for cooperative communications of member UEs of a virtual UE according to one aspect of the present disclosure. Operations of the example blocks may be performed by a UE, such as member UE 115 described above with reference to FIG. 1, 2, or 7. For example, example operations of the example blocks may enable member UE 115 to support uplink control channel group and cross-carrier scheduling for cooperative communications of member UEs of a virtual UE.

In some implementations, a virtual UE includes multiple member UEs, each of which may include the structure, hardware, and components shown and described with reference to member UE 115 of FIGS. 1, 2, and 7. For example, member UE 115 includes controller 280, which operates to execute logic or computer instructions stored in memory 282, as well as controlling the components of member UE 115 that provide the features and functionality of member UE 115. Member UE 115, under control of controller 280, transmits and receives signals via wireless radios 700a-r and antennas 252a-r. Wireless radios 700a-r include various components and hardware, as illustrated in FIG. 2 for member UE 115, including modulator and demodulators 254a-r, MIMO detector 256, receive processor 258, transmit processor 264, and TX MIMO processor 266.

As shown, memory 282 may include virtual UE logic 701, virtual UE configuration 702, and CC set configuration 703. Virtual UE logic 701 may be configured to provide member UE 115 with the features and functionality, when executed by controller/processor 280 (referred to herein as the "execution environment" of virtual UE logic 801) of the cooperative operation with one or more other member UEs as a virtual UE. Virtual UE configuration 702 stores the configuration information that identifies which other UEs are member UEs of the virtual UE, as well as any communication parameters for communicating with the other member UEs and with a serving base station as the virtual UE. CC set configuration 703 identifies the CCs of the allocated cell group that are assigned to a particular CC set. UE 115 may receive signals from or transmit signals to one or more network entities, such as base station 105 or another member UE of the virtual UE described in FIG. 1, 2, 3, 7, or 8.

At block 500, a member UE reports a cooperative configuration with one or more member UEs of a virtual UE. A virtual UE may be implemented through the cooperative communications with each of the member UEs. A member UE, such as member UE 115, executes, under control of controller/processor 280, virtual UE logic 701, stored in memory 282. Within the execution environment of virtual UE logic 701, member UE 115 interacts with other UEs with virtual UE capabilities, to form a virtual UE. The various information, parameters, and configurations for member UE 115 to work with other member UEs in a virtual UE in communication with a serving base station, may be stored in memory 282 at virtual UE configuration 702.

At block 501, the member UE reports associations between a plurality of CCs allocated to a cell group and each member UE of the virtual UE. Member UE 115 may determine via detecting of signals via antennas 252a-r and wireless radios 700a-r, which band combinations or sets of CCs may be available for access by member UE 115. Member UE 115 may track this resource availability information in CC set configuration 703, stored in memory 282. Member UE 115, within the execution environment of virtual UE logic 701 will report associations between itself and multiple CCs, whether directly indicating CCs, indirectly identifying available band combinations, or even signifying a maximum number of CCs to be handled by any particular CC set. Member UE 115 sends this report to a serving base station via wireless radios 700a-r and 252a-r.

At block 502, the member UE receives an uplink control transmission configuration message dividing the each member UE of the virtual UE into an assigned uplink control transmission group of a plurality of uplink control transmission groups and assigning one or more component CCs of the plurality of CCs into one or more CC sets, wherein each CC set of the one or more CC sets is assigned to each uplink control transmission group of the plurality of uplink control transmission groups. Member UE 115 may receive configuration signaling from the serving base station via antennas 252a-r and mobile radios 700a-r. Within the configuration signaling, the base station may indicate assignment of the CCs of the allocated cell group to corresponding CC sets and an association of the CC sets to each member UE of the virtual UE. The configuration signaling may further include configuration of uplink control transmission groups for identifying the uplink control transmission resource (e.g., PUCCH) for each CC set.

At block 503, the member UE receives an uplink scheduling message from the serving base station, wherein the uplink scheduling message includes an uplink schedule for CCs within the CC set assigned to an uplink control transmission group associated with the UE. Once configured with the CC sets of the carrier group and uplink control transmission groups, member UE 115 may receive uplink scheduling messages from the serving base station that may either schedule uplink data transmissions or uplink control transmissions. Each schedule for transmission may be used for scheduling a CC within a given CC set and the acknowledgement status transmitted for each PUCCH group will include acknowledgement statuses for CCs within the same CC set.

FIG. 5B is a block diagram illustrating example blocks executed by a base station to implement uplink control channel group and cross-carrier scheduling for cooperative communications of member UEs of a virtual UE according to aspects of the present disclosure. Operations of the example blocks may be performed by a base station, such as base station 105 described above with reference to FIGS. 1 and 2 or base station 105 as described above with reference to FIG. 8. For example, example operations of the example blocks may enable base station 105 to support uplink control channel group and cross-carrier scheduling for cooperative communications of member UEs of a virtual UE.

Base station 105 may be configured to perform operations, including the example blocks described with reference to FIG. 4B. In some implementations, base station 105 includes the structure, hardware, and components shown and described with reference to base station 105 of FIGS. 1, 2, and 8. For example, base station 105 may include controller 240, which operates to execute logic or computer instructions stored in memory 242, as well as controlling the components of base station 105 that provide the features and functionality of base station 105. Base station 105, under control of controller 240, transmits and receives signals via wireless radios 800a-t and antennas 234a-t. Wireless radios 800a-t include various components and hardware, as illustrated in FIG. 2 for base station 105, including modulator and demodulators 232a-t, transmit processor 220, TX MIMO processor 230, MIMO detector 236, and receive processor 238.

As shown, the memory 242 may include virtual UE logic 801, virtual UE configuration 802, data 803, and HARQ management logic 804. Virtual UE logic 801 may be configured to provide base station 105 with the functionality to interact with a virtual UE including multiple member UEs, which may be seen by base station 105 as multiple different antenna panels, sets of antennas, and the like, of the virtual UE. Virtual UE configuration 802 includes various information, parameters, and configurations for base station 105 to communication with the virtual UE via its member UEs. CC set configuration 803 identifies the CCs of the allocated cell group that are assigned to a particular CC set. Base station 105 may receive signals from or transmit signals to one or more member UEs of a virtual UE, such as UE 115 of FIG. 1, 2, or 7.

At block 510, a base station receives a cooperative configuration with one or more member UEs of a virtual UE. As noted, a virtual UE may be implemented through the cooperative communications with each of the member UEs. The member UEs that have established operation of a virtual UE communicate the capabilities and the formation of the virtual UE with base station 105. Base station 105 executes, under control of controller/processor 240, virtual UE logic 801, stored in memory 242. Within the execution environment of virtual UE logic 801, base station 105 may interact with the virtual UE via the member UEs, which may be seen by base station 105 as multiple different antenna panels, sets of antennas, and the like. The various information, parameters, and configurations for base station 105 to communication with the virtual UE and its member UEs in a virtual UE may be stored in memory 242 at virtual UE configuration 802.

At block 511, the base station receives associations between a plurality of CCs allocated to a cell group and each member UE of the virtual UE. Within the execution environment of virtual UE logic 801, base station 105 monitors for signaling from the virtual UE that indicates associations between multiple CCs, whether directly through identification of CC associations or lists of CCs for a CC set, or by band combinations. Base station 105 may receive such signaling via antennas 234a-t and wireless radios 800a-t.

At block 512, the base station transmits an uplink control transmission configuration message dividing the each member UE of the virtual UE into an assigned uplink control transmission group of a plurality of uplink control transmission groups and assigning, in response to the associations, one or more component CCs of the plurality of CCs into one or more CC sets, wherein each CC set of the one or more CC sets is assigned to each uplink control transmission group of the plurality of uplink control transmission groups. Within the execution environment of virtual UE logic 801, base station 105 may use the associations received from the virtual UE, via multiple member UEs, and configure CC sets by assigning certain CCs of the cell group allocation to the virtual UE to certain CC sets. Base station 105 may further configure uplink control transmission groups (e.g., PUCCH groups) for the cell group and each member UE of the virtual UEs. Such configuration messages may be transmitted to the member UEs of the virtual UE via wireless radios 800a-t and antennas 234a-t.

At block 513, the base station transmits an uplink scheduling message to the served UE, wherein the uplink scheduling message includes an uplink schedule for CCs within the CC set assigned to an uplink control transmission group associated with the served UE. Once configured with the CC sets of the carrier group and uplink control transmission groups, base station may transmit uplink scheduling messages to the member UEs that may either schedule uplink data transmissions or uplink control transmissions. Each schedule for transmission may be used for scheduling a CC within a given CC set and the acknowledgement status transmitted for each PUCCH group will include acknowledgement statuses for CCs within the same CC set.

FIG. 6A is a block diagram illustrating a wireless network 60 including base station 105 and member UEs 115a-115c cooperatively communicating as a virtual UE 600 and configured to provide uplink control channel group and cross-carrier scheduling for cooperative communications of member UEs of a virtual UE according to aspects of the present disclosure. In implementing a virtual UE, such as virtual UE 600, a target UE, member UE 115a, desiring to establish such a cooperative relationship exchanges communications with member UEs 115b and 115c to establish the virtual UE configuration for virtual UE 600. Virtual UE 600, through member UEs 115a-115c, signal capability signals 602 to base station 105 to indicate cooperative communications between member UEs 115a-115c as virtual UE 600.

Member UEs 115a-115c may each detect or measure the availability or accessibility of various access bands or individual CCs with different bands. If the network is aware of the associations of each CC or band with each distributed panel/set of antennas/baseband processor of virtual UE 600 (e.g., member UEs 115a-115c), the network, via base station 105, may configure communications with virtual UE 600 in order to avoid either a CC associated with one of member UEs 115a-115c being included in an uplink control transmission group (e.g., PUCCH group) configured for another one of member UE 115a-115c, or sending scheduling messages on a CC associated with one of member UEs 115a-115c that cross-carrier schedules a CC associated with another one of members UE 115a-115c. Such configuration may be transmitted from base station 105 to member UEs 115a-115c via conventional control signaling, such as RRC signaling, medium access control-control element (MAC-CE), or the like.

In one example aspect for providing uplink control channel group and cross-carrier scheduling for cooperative communications of member UEs of a virtual UE, member UEs 115a-115c may add information regarding the associations of member UEs 115a-115c with different CCs or different available band combinations to capability signals 602. As part UE capability signaling, which may occur before configuration of the carrier group, virtual UE 600, via member UEs 115a-115c, conveys such associations which allow base station 105 to configure cell group 601 accordingly. Upon receipt of capability signals 602, base station 105 determines the configuration of the carrier group which may assign particular CCs to particular ones of member UEs 115a-115c according to the associations and transmit carrier group configuration 603 to virtual UE 600 via member UEs 115a-115c.

In a first alternative implementation, member UEs 115a-115c may indicate a supported band combination by explicitly indicating the associations of multiple CC sets, or indicating which CCs can belong to the same CC set or which CCs cannot belong to the same CC set. The granularity of such signaling that member UEs 115a-115c can include in capability signals 602 can be on a per CC basis or on a per band basis, with the assumptions that all CCs in a particular band may belong to the same CC set. When provided explicitly, capability signals 602 from UE 115a may identify CC set 604, which includes CC0 and CC1, capability signals 602 from UE 115b may identify CC set 605, which includes CC2, and capability signals 602 from UE 115c may identify CC set 606, which includes CC3 and CC4.

In a second alternative implementation, each supported band combination indicated by member UEs 115a-115c through capability signaling 602 may include two or more elements: Each element includes a band combination corresponding to a particular CC set. Where there may a common CC or band in multiple band combination elements of capability signaling 602, the carrier group configuration may be resolved by determining sufficient CCs in each proposed CC set. For example, member UEs 115a-115c transmit capability signals 602 which include multiple associations of band combinations. One band combination associated with member UE 115a identifies CC0 and CC1, and another band combination associated with member UE 115b identifies CC1 and CC2. As the primary or target member UE, base station 105 may determine to include the shared CC, CC1, in CC set 604 including CC0 and CC1, because the band combination for member UE 115b included both CC1 and CC2; thus, leaving at least one CC, CC2 to be configured to CC set 605 assigned to virtual UE 600 via member UE 115b.

It should be noted that when each of member UEs 115a-115c indicates support of a band combination for carrier aggregation, that indication may further include a list of bands that can be simultaneously supported by the corresponding member UE, and, within each band, characterizations of different CCs, such as the bandwidth of each CC, number of CCs, etc., that are indicated.

The introduction of the "CC set" within a cell group, according to the various aspects of the present disclosure allows for CCs associated with the same one of member UEs 115a-115c (e.g., the antenna panel/same set of antennas/same baseband processor of virtual UE 600) to belong to the same CC set. Base station 105 will configure the uplink control transmission groups (e.g., PUCCH groups) not to include CCs that belong to different ones of CC sets 604-606. All CCs configured by base station 105 with the same uplink control transmission group will belong to the same CC set. Moreover, as the uplink control transmission groups will include CCs of the same CC set, cross-carrier scheduling can be configured within CCs that belong to the same CC set, which may avoid cross-carrier scheduling for different member UEs.

For example, base station 105 configures primary PUCCH group for CC set 604 with CC0-CC1 associated with member UE 115a, configures secondary PUCCH group 1 for CC set 605 with CC2 associated with member UE 115b, and configures secondary PUCCH group 2 for CC set 606 with CC3-CC4 associated with UE member 115c. Thus, all acknowledgement signaling within each of primary PUCCH group—CC set 604, secondary PUCCH group 1—CC set 605, and secondary PUCCH group 2—CC set 606 may be completed without UE-to-UE communication of any acknowledgement status for different member UEs of virtual UE 600. Further, scheduling received for CC0 of CC set 604 may either self-schedule transmissions for CC0 or cross-carrier schedule transmissions for CC1, within the same CC set 604.

FIG. 6B is a block diagram illustrating a wireless network 60 including base station 105 and member UEs 115a-115b cooperatively communicating as a virtual UE 612 and configured to provide uplink control channel group and cross-carrier scheduling for cooperative communications of member UEs of a virtual UE according to aspects of the present disclosure. As noted with regard to FIG. 6A, a virtual UE, such as virtual UE 612, may be established through cooperative communications of member UEs 115a-115b, which may then indicate virtual UE capabilities to base station 105. In configuring virtual UE 612, base station 105 transmits carrier group configuration 607 to virtual UE 612, via member UEs 115a-115b. Carrier group configuration 607 assigns cell group 601, including CC0-CC4, to virtual UE 612 for communications. Once virtual UE 612 is configured with cell group 601, member UEs 115a-115b transmits association indication 608 to base station 105.

In a first alternative implementation, virtual UE 612, through member UEs 115a-115b, may decide which CC of cell group 601 may correspond to which of member UE 115a-115b and includes this assignment of associations in association indication 608 to base station 105. For example, base station 105 configures virtual UE 612 with cell group 60 that includes CC0-CC4. Virtual UE 612 includes member UEs 115a-115b. Thus, association indication 608 may include one or more possible configurations for two CC sets. For example, virtual UE 612, through member UEs 115a-115b, may indicate ({0,1,2}{3,4}) and/or ({0,2,4},{1,3}) for one or two possible configurations of two CC sets. If CC0-CC4 were configured and virtual UE 612 had three member UEs, similarly to virtual UE 600 (FIG. 6A), the three member UE virtual UE may indicate ({0,1}{3,4}{2}) and/or ({0},{1,3},{2,4}) for one or two possible configurations of three CC sets in association indication 608.

In a second alternative implementation, virtual UE 612 may indicate the maximum number of CCs that can belong to a given CC set. This indication of the maximum number of CCs may either be included in association indication 608 or may also be included in capability signals 602 (FIG. 6A). Association indication 608 may be implemented via higher-layer signaling, such as RRC or MAC-CE signaling. For example, virtual UE 612 includes two member UEs, member UEs 115a-115b. Virtual UE 612, via member UEs 115a-115b, may indicate {3,2} in association indication 608 (or capability signals 602 (FIG. 6A)) where member UE 115a has the capability to process up to three CCs and member UE 115b has the capability to process up to two CCs. Base station 105 may then select which CCs of cell group 601 to group into CC sets according to the maximum number indicated in association indication 608. Base station 105 transmits PUCCH group configuration 609 in accordance with the associations identified in association indication 608. As illustrated, the primary PUCCH group is configured with CC set 610, including CC0-CC2, and secondary PUCCH group is configured with CC set 611, including CC3-CC4. Here again, acknowledgement signaling may be completed without the acknowledgement state for transmissions on CCs in a different CC set, and any cross-carrier scheduling included in CCs of a first CC set, such as CC set 610, will not attempt cross-carrier schedule CCs of a different CC set, such as CC set 611.

In one or more aspects, techniques for supporting uplink control channel group and cross-carrier scheduling for cooperative communications of member UEs of a virtual UE may include additional aspects, such as any single aspect or any combination of aspects described below or in connection with one or more other processes or devices described elsewhere herein. In one or more aspects, supporting uplink control channel group and cross-carrier scheduling for cooperative communications of member UEs of a virtual UE may include an apparatus configured to report, by the UE to a serving base station, a cooperative configuration with one or more member UEs of a virtual UE and report, by the UE to the serving base station, associations between a plurality of CCs allocated to a cell group and each member UE of the virtual UE. The apparatus is further configured to receive, by the UE, an uplink control transmission configuration message dividing the each member UE of the virtual UE into an assigned uplink control transmission group of a plurality of uplink control transmission groups and assigning one or more component CCs of the plurality of CCs into one or more CC sets, wherein each CC set of the one or more CC sets is assigned to each uplink control transmission group of the plurality of uplink control transmission groups, and receive, by the UE, an uplink scheduling message from the serving base station, wherein the uplink scheduling message includes an uplink schedule for CCs within the CC set assigned to an uplink control transmission group associated with the UE.

Additionally, the apparatus may perform or operate according to one or more aspects as described below. In some implementations, the apparatus includes a wireless device, such as a UE. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In one or more aspects, techniques for supporting uplink control channel group and cross-carrier scheduling for cooperative communications of member UEs of a virtual UE may include additional aspects, such as any single aspect or any combination of aspects described below or in connection with one or more other processes or devices described elsewhere herein. In one or more aspects, supporting uplink control channel group and cross-carrier scheduling for cooperative communications of member UEs of a virtual UE may include an apparatus configured to receive, by the base station from a served UE, a cooperative configuration with one or more member UEs of a virtual UE, and receive, by the base station from the served UE, associations between a plurality of CCs allocated to a cell group and each member UE of the virtual UE. The apparatus is further configured to transmit, by the base station, an uplink control transmission configuration message dividing the each member UE of the virtual UE into an assigned uplink control transmission group of a plurality of uplink control transmission groups and assigning, in response to the associations, one or more component CCs of the plurality of CCs into one or more CC sets, wherein each CC set of the one or more CC sets is assigned to each uplink control transmission group of the plurality of uplink control transmission groups, and transmit, by the base station, an uplink scheduling message to the served UE, wherein the uplink scheduling message includes an uplink schedule for CCs within the CC set assigned to an uplink control transmission group associated with the served UE.

Additionally, the apparatus may perform or operate according to one or more aspects as described below. In some implementations, the apparatus includes a wireless device, such as a base station. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a first aspect of a UE configured for wireless communication, the UE includes, reporting, by the UE to a serving base station, a cooperative configuration with one or more member UEs of a virtual UE; reporting, by the UE to the serving base station, associations between a plurality of CCs allocated to a cell group and each member UE of the virtual UE; receiving, by the UE, an uplink control transmission configuration message dividing the each member UE of the virtual UE into an assigned uplink control transmission group of a plurality of uplink control transmission groups and assigning one or more component CCs of the plurality of CCs into one or more CC sets, wherein each CC set of the one or more CC sets is assigned to each uplink control transmission group of the plurality of uplink control transmission groups; and receiving, by the UE, an uplink scheduling message from the serving base station, wherein the uplink scheduling message includes an uplink schedule for CCs within the CC set assigned to an uplink control transmission group associated with the UE.

In a second aspect, alone or in combination with the first aspect, wherein the reporting the associations includes: transmitting a capability message including the associations, wherein the associations include one or more supported frequency band combination identifications for each member UE of the virtual UE.

In a third aspect, alone or in combination with any one or more of the first aspect or the second aspect, wherein the one or more supported frequency band combination identifications includes one of: identification of the one or more CC sets; a list of CCs available for each CC set of the one or more CC sets; a list of unusable CCs unavailable for each CC set of the one or more CC sets; a list of available frequency bands available for each CC set of the one or more CC sets; a list of unusable frequency bands unavailable for each CC set of the one or more CC sets; or a maximum number of CCs includable in each CC set of the one or more CC sets.

In a fourth aspect, alone or in combination with any one or more of the first aspect through the third aspect, wherein the one or more supported frequency band combination identifications includes indication of a frequency band combination available for each CC set of the one or more CC sets.

In a fifth aspect, alone or in combination with any one or more of the first aspect through the fourth aspect, further comprising: determining, by the UE, that one of a CC or a frequency band is available in the frequency band combination of at least two CC sets of the one or more CC sets; and setting, by the UE, the one of the CC or the frequency band available for the at least two CC sets to the frequency band combination of a first CC set of the at least two CC sets when at least one of an additional CC or an additional frequency band of the frequency band combination of the other CC sets of the at least two CC sets is configured for the virtual UE.

In a sixth aspect, alone or in combination with any one or more of the first aspect through the fifth aspect, wherein the capability message further include characteristics of each band within the one or more supported frequency band combination identifications, wherein the characteristics include one or more of a bandwidth of each CC and a number of CCs.

In a seventh aspect, alone or in combination with any one or more of the first aspect through the sixth aspect, receiving, by the UE, a cell group configuration message from the serving base station, wherein the cell group configuration message includes configuration of the plurality of CCs to the virtual UE.

In an eighth aspect, alone or in combination with any one or more of the first aspect through the seventh aspect, wherein the reporting the associations includes one of: reporting one or more candidate sets of CCs for each CC set of the one or more CC sets; or reporting a maximum number of CCs includable in each CC set of the one or more CC sets.

In a ninth aspect of a base station configured for wireless communication includes receiving, by the base station from a served UE, a cooperative configuration with one or more member UEs of a virtual UE; receiving, by the base station from the served UE, associations between a plurality of CCs allocated to a cell group and each member UE of the virtual UE; transmitting, by the base station, an uplink control transmission configuration message dividing the each member UE of the virtual UE into an assigned uplink control transmission group of a plurality of uplink control transmission groups and assigning, in response to the associations, one or more component CCs of the plurality of CCs into one or more CC sets, wherein each CC set of the one or more CC sets is assigned to each uplink control transmission group of the plurality of uplink control transmission groups; and transmitting, by the base station, an uplink scheduling message to the served UE, wherein the uplink scheduling message includes an uplink schedule for CCs within the CC set assigned to an uplink control transmission group associated with the served UE.

In a tenth aspect, alone or in combination with the ninth aspect includes receiving a capability message including the associations, wherein the associations include one or more supported frequency band combination identifications for each member UE of the virtual UE.

In an eleventh aspect, alone or in combination with any one or more of the ninth aspect and the tenth aspect, wherein the one or more supported frequency band combination identifications includes one of: identification of the one or more CC sets; a list of CCs available for each CC set of the one or more CC sets; a list of unusable CCs unavailable for each CC set of the one or more CC sets; a list of available frequency bands available for each CC set of the one or more CC sets; a list of unusable frequency bands unavailable for each CC set of the one or more CC sets; or a maximum number of CCs includable in each CC set of the one or more CC sets.

In an twelfth aspect, alone or in combination with any one or more of the ninth aspect through the eleventh aspect, wherein the one or more supported frequency band combination identifications includes indication of a frequency band combination available for each CC set of the one or more CC sets.

In a thirteenth aspect, alone or in combination with any one or more of the ninth aspect through the twelfth aspect, wherein the capability message further include characteristics of each band within the one or more supported frequency band combination identifications, wherein the characteristics include one or more of a bandwidth of each CC and a number of CCs.

In a fourteenth aspect, alone or in combination with any one or more of the ninth aspect through the thirteenth aspect further including: transmitting, by the base station, a cell group configuration message to the served UE, wherein the cell group configuration message includes configuration of the plurality of CCs to the virtual UE.

In a fifteenth aspect, alone or in combination with any one or more of the ninth aspect through the fourteenth aspect, wherein the receiving the associations includes one of: receiving one or more candidate sets of CCs for each CC set of the one or more CC sets; or receiving a maximum number of CCs includable in each CC set of the one or more CC sets.

In a sixteenth aspect of a UE configured for wireless communication, the UE includes at least one processor; and a memory coupled to the at least one processor, wherein the at least one processor is configured: to report, by the UE to a serving base station, a cooperative configuration with one or more member UEs of a virtual UE; to report, by the UE to the serving base station, associations between a plurality of CCs allocated to a cell group and each member UE of the virtual UE; to receive, by the UE, an uplink control transmission configuration message dividing the each member UE of the virtual UE into an assigned uplink control transmission group of a plurality of uplink control transmission groups and assigning one or more component CCs of the plurality of CCs into one or more CC sets, wherein each CC set of the one or more CC sets is assigned to each uplink control transmission group of the plurality of uplink control transmission groups; and to receive, by the UE, an uplink scheduling message from the serving base station, wherein the uplink scheduling message includes an uplink schedule for CCs within the CC set assigned to an uplink control transmission group associated with the UE.

In a seventeenth aspect, alone or in combination with the sixteenth aspect, wherein the configuration of the at least one processor to report the associations includes configuration of the at least one processor: to transmit a capability message including the associations, wherein the associations include one or more supported frequency band combination identifications for each member UE of the virtual UE.

In an eighteenth aspect, alone or in combination with the sixteenth aspect and the seventeenth aspect, wherein the one or more supported frequency band combination identifications includes one of: identification of the one or more CC sets; a list of CCs available for each CC set of the one or more CC sets; a list of unusable CCs unavailable for each CC set of the one or more CC sets; a list of available frequency bands available for each CC set of the one or more CC sets; a list of unusable frequency bands unavailable for each CC set of the one or more CC sets; or a maximum number of CCs includable in each CC set of the one or more CC sets.

In a nineteenth aspect, alone or in combination with any one or more of the sixteenth aspect through the eighteenth aspects, wherein the one or more supported frequency band combination identifications includes indication of a frequency band combination available for each CC set of the one or more CC sets.

In a twentieth aspect, alone or in combination with any one or more of sixteenth aspect through the nineteenth aspect, further comprising configuration of the at least one processor: to determine, by the UE, that one of a CC or a frequency band is available in the frequency band combination of at least two CC sets of the one or more CC sets; and to set, by the UE, the one of the CC or the frequency band available for the at least two CC sets to the frequency band combination of a first CC set of the at least two CC sets when at least one of an additional CC or an additional frequency band of the frequency band combination of the other CC sets of the at least two CC sets is configured for the virtual UE.

In a twenty-first aspect, alone or in combination with any one or more of the sixteenth aspect through the twentieth aspect, wherein the capability message further include characteristics of each band within the one or more supported frequency band combination identifications, wherein the characteristics include one or more of a bandwidth of each CC and a number of CCs.

In a twenty-second aspect, alone or in combination with any one or more of the sixteenth aspect through the twenty-first aspect, further including configuration of the at least one processor: to receive, by the UE, a cell group configuration message from the serving base station, wherein the cell group configuration message includes configuration of the plurality of CCs to the virtual UE.

In a twenty-third aspect, alone or in combination with any one or more of the sixteenth aspect through the twenty-second aspect, wherein the configuration of the at least one processor to report the associations includes configuration of the at least one processor to one of: report one or more candidate sets of CCs for each CC set of the one or more CC sets; or report a maximum number of CCs includable in each CC set of the one or more CC sets.

In a twenty-fourth aspect of a base station configured for wireless communication, the base station includes at least one processor; and a memory coupled to the at least one processor, wherein the at least one processor is configured: to receive, by the base station from a served UE, a cooperative configuration with one or more member UEs of a virtual UE; to receive, by the base station from the served UE, associations between a plurality of CCs allocated to a cell group and each member UE of the virtual UE; to transmit, by the base station, an uplink control transmission configuration message dividing the each member UE of the virtual UE into an assigned uplink control transmission group of a plurality of uplink control transmission groups and assigning, in response to the associations, one or more component CCs of the plurality of CCs into one or more CC sets, wherein each CC set of the one or more CC sets is assigned to each uplink control transmission group of the plurality of uplink control transmission groups; and to transmit, by the base station, an uplink scheduling message to the served UE, wherein the uplink scheduling message includes an uplink schedule for CCs within the CC set assigned to an uplink control transmission group associated with the served UE.

In a twenty-fifth aspect, alone or in combination with the twenty-fourth aspect, wherein the configuration of the at least one processor to receive the associations includes configuration of the at least one processor: to receive a capability message including the associations, wherein the associations include one or more supported frequency band combination identifications for each member UE of the virtual UE.

In a twenty-sixth aspect, alone or in combination with any one or more of the twenty-fourth aspect and the twenty-fifth aspect, wherein the one or more supported frequency band combination identifications includes one of: identification of the one or more CC sets; a list of CCs available for each CC set of the one or more CC sets; a list of unusable CCs unavailable for each CC set of the one or more CC sets; a list of available frequency bands available for each CC set of the one or more CC sets; a list of unusable frequency bands unavailable for each CC set of the one or more CC sets; or a maximum number of CCs includable in each CC set of the one or more CC sets.

In a twenty-seventh aspect, alone or in combination with any one or more of the twenty-fourth aspect through the twenty-sixth aspect, wherein the one or more supported frequency band combination identifications includes indication of a frequency band combination available for each CC set of the one or more CC sets.

In a twenty-eighth aspect, alone or in combination with any one or more of the twenty-fourth aspect through the twenty seventh aspect, wherein the capability message further include characteristics of each band within the one or more supported frequency band combination identifications, wherein the characteristics include one or more of a bandwidth of each CC and a number of CCs.

In a twenty-ninth aspect, alone or in combination with any one or more of the twenty-fourth aspect through the twenty-eighth aspect, further including configuration of the at least one processor: to transmit, by the base station, a cell group configuration message to the served UE, wherein the cell group configuration message includes configuration of the plurality of CCs to the virtual UE.

In a thirtieth aspect, alone or in combination with any one or more of the twenty-fourth aspect through the twenty-ninth aspect, wherein the configuration of the at least one processor to receive the associations includes configuration of the at least one processor to one of: receive one or more candidate sets of CCs for each CC set of the one or more CC sets; or receive a maximum number of CCs includable in each CC set of the one or more CC sets.

In a thirty-first aspect of a UE configured for wireless communication, comprising: means for reporting, by the UE to a serving base station, a cooperative configuration with one or more member UEs of a virtual UE; means for reporting, by the UE to the serving base station, associations between a plurality of CCs allocated to a cell group and each member UE of the virtual UE; means for receiving, by the UE, an uplink control transmission configuration message dividing the each member UE of the virtual UE into an assigned uplink control transmission group of a plurality of uplink control transmission groups and assigning one or more component CCs of the plurality of CCs into one or more CC sets, wherein each CC set of the one or more CC sets is assigned to each uplink control transmission group of the plurality of uplink control transmission groups; and means for receiving, by the UE, an uplink scheduling message from the serving base station, wherein the uplink scheduling message includes an uplink schedule for CCs within the CC set assigned to an uplink control transmission group associated with the UE.

In a thirty-second aspect, alone or in combination with the thirty-first aspect, wherein the means for reporting the associations includes: means for transmitting a capability message including the associations, wherein the associations include one or more supported frequency band combination identifications for each member UE of the virtual UE.

In a thirty-third aspect, alone or in combination with any one or more of the thirty-first aspect through the thirty-third aspect, wherein the one or more supported frequency band combination identifications includes one of: identification of the one or more CC sets; a list of CCs available for each CC set of the one or more CC sets; a list of unusable CCs unavailable for each CC set of the one or more CC sets; a list of available frequency bands available for each CC set of the one or more CC sets; a list of unusable frequency bands unavailable for each CC set of the one or more CC sets; or a maximum number of CCs includable in each CC set of the one or more CC sets.

In a thirty-fourth aspect, alone or in combination with any one or more of the thirty-first aspect through the thirty-third aspect.

In a thirty-fourth aspect, alone or in combination with any one or more of the thirty-first aspect through the thirty-third aspect, wherein the one or more supported frequency band combination identifications includes indication of a frequency band combination available for each CC set of the one or more CC sets.

In a thirty-fifth aspect, alone or in combination with any one or more of the thirty-first aspect through the thirty-forth aspect means for determining, by the UE, that one of a CC or a frequency band is available in the frequency band combination of at least two CC sets of the one or more CC sets; and means for setting, by the UE, the one of the CC or the frequency band available for the at least two CC sets to the frequency band combination of a first CC set of the at least two CC sets when at least one of an additional CC or an additional frequency band of the frequency band combination of the other CC sets of the at least two CC sets is configured for the virtual UE.

In a thirty-sixth aspect, alone or in combination with any one or more of the thirty-first aspect through the thirty-fifth aspect, wherein the capability message further include characteristics of each band within the one or more supported frequency band combination identifications, wherein the characteristics include one or more of a bandwidth of each CC and a number of CCs.

In a thirty-seventh aspect, alone or in combination with any one or more of the thirty-first through the thirty-sixth aspect, further including: means for receiving, by the UE, a cell group configuration message from the serving base station, wherein the cell group configuration message includes configuration of the plurality of CCs to the virtual UE.

In a thirty-eighth aspect, alone or in combination with any one or more of the thirty-first aspect through the thirty-seventh aspect, wherein the means for reporting the associations includes one of: means for reporting one or more candidate sets of CCs for each CC set of the one or more CC sets; or means for reporting a maximum number of CCs includable in each CC set of the one or more CC sets.

In a thirty-ninth aspect of a base station configured for wireless communication, including means for receiving, by the base station from a served UE, a cooperative configuration with one or more member UEs of a virtual UE; means for receiving, by the base station from the served UE, associations between a plurality of component carriers (CCs) allocated to a cell group and each member UE of the virtual UE; means for transmitting, by the base station, an uplink control transmission configuration message dividing the each member UE of the virtual UE into an assigned uplink control transmission group of a plurality of uplink control transmission groups and assigning, in response to the associations, one or more component CCs of the plurality of CCs into one or more CC sets, wherein each CC set of the one or more CC sets is assigned to each uplink control transmission group of the plurality of uplink control transmission groups; and means for transmitting, by the base station, an uplink scheduling message to the served UE, wherein the uplink scheduling message includes an uplink schedule for CCs within the CC set assigned to an uplink control transmission group associated with the served UE.

In a fortieth aspect, alone or in combination with one or more of the thirty-ninth aspect and the fortieth aspect, wherein the means for receiving the associations includes: means for receiving a capability message including the associations, wherein the associations include one or more supported frequency band combination identifications for each member UE of the virtual UE.

In a forty-first aspect, alone or in combination with one or more of the thirty-ninth aspect through the fortieth aspect, wherein the one or more supported frequency band combination identifications includes one of: identification of the one or more CC sets; a list of CCs available for each CC set of the one or more CC sets; a list of unusable CCs unavailable for each CC set of the one or more CC sets; a list of available frequency bands available for each CC set of the one or more CC sets; a list of unusable frequency bands unavailable for each CC set of the one or more CC sets; or a maximum number of CCs includable in each CC set of the one or more CC sets.

In a forty-second aspect, alone or in combination with any one or more of the thirty-ninth aspect through the forty-first aspect, wherein the one or more supported frequency band combination identifications includes indication of a frequency band combination available for each CC set of the one or more CC sets.

In a forty-third aspect, alone or in combination with any one or more of the thirty-ninth aspect through the forty-second aspect, wherein the capability message further include characteristics of each band within the one or more supported frequency band combination identifications, wherein the characteristics include one or more of a bandwidth of each CC and a number of CCs.

In a forty-fourth aspect, alone or in combination with any one or more of the thirty-ninth aspect through the forty-third aspect, further including: means for transmitting, by the base station, a cell group configuration message to the served UE, wherein the cell group configuration message includes configuration of the plurality of CCs to the virtual UE.

In a forty-fifth aspect, alone or in combination with any one or more of the thirty-ninth aspect, through the forty-fourth aspect, wherein the means for receiving the associations includes one of: means for receiving one or more candidate sets of CCs for each CC set of the one or more CC sets; or means for receiving a maximum number of CCs includable in each CC set of the one or more CC sets.

In a forty-sixth aspect of a UE with non-transitory computer-readable medium having program code recorded thereon, the program code includes program code executable by a computer for causing the computer to report, by the UE to a serving base station, a cooperative configuration with one or more member UEs of a virtual UE; program code executable by the computer for causing the computer to report, by the UE to the serving base station, associations between a plurality of CCs allocated to a cell group and each member UE of the virtual UE; program code executable by the computer for causing the computer to receive, by the UE, an uplink control transmission configuration message dividing the each member UE of the virtual UE into an assigned uplink control transmission group of a plurality of uplink control transmission groups and assigning one or more component CCs of the plurality of CCs into one or more CC sets, wherein each CC set of the one or more CC sets is assigned to each uplink control transmission group of the plurality of uplink control transmission groups; and program code executable by the computer for causing the computer to receive, by the UE, an uplink scheduling message from the serving base station, wherein the uplink scheduling message includes an uplink schedule for CCs within the CC set assigned to an uplink control transmission group associated with the UE.

In a forty-seventh aspect, alone or in combination with the forty-sixth aspect, wherein the program code executable by the computer for causing the computer to report the associations includes: program code executable by the computer for causing the computer to transmit a capability message including the associations, wherein the associations include one or more supported frequency band combination identifications for each member UE of the virtual UE.

In a forty-eighth aspect, alone or in combination with any one or more of the forty-sixty and forty-seventh aspect, wherein the one or more supported frequency band combination identifications includes one of: identification of the one or more CC sets; a list of CCs available for each CC set of the one or more CC sets; a list of unusable CCs unavailable for each CC set of the one or more CC sets; a list of available frequency bands available for each CC set of the one or more CC sets; a list of unusable frequency bands unavailable for each CC set of the one or more CC sets; or a maximum number of CCs includable in each CC set of the one or more CC sets.

In a forty-ninth aspect, alone or in combination with any one or more of the forty-sixty aspect and the forty-eighth aspect, wherein the one or more supported frequency band combination identifications includes indication of a frequency band combination available for each CC set of the one or more CC sets.

In a fiftieth aspect, alone or in combination with any one or more of the forty-sixty aspect and the forty-ninth aspect, further comprising: program code executable by the computer for causing the computer to determine, by the UE, that one of a CC or a frequency band is available in the frequency band combination of at least two CC sets of the one or more CC sets; and program code executable by the computer for causing the computer to set, by the UE, the one of the CC or the frequency band available for the at least two CC sets to the frequency band combination of a first CC set of the at least two CC sets when at least one of an additional CC or an additional frequency band of the frequency band combination of the other CC sets of the at least two CC sets is configured for the virtual UE.

In a fifty-first aspect, alone or in combination with any one or more of the forty-sixty aspect and the fiftieth aspect, wherein the capability message further include characteristics of each band within the one or more supported frequency band combination identifications, wherein the characteristics include one or more of a bandwidth of each CC and a number of CCs.

In a fifty-second aspect, alone or in combination with any one or more of the forty-sixty aspect and the fifty-first aspect, further including: program code executable by the computer for causing the computer to receive, by the UE, a cell group configuration message from the serving base station, wherein the cell group configuration message includes configuration of the plurality of CCs to the virtual UE.

In a fifty-third aspect, alone or in combination with any one or more of the forty-sixty aspect and the fifty-second aspect, wherein the program code executable by the computer for causing the computer to report the associations includes one of: program code executable by the computer for causing the computer to report one or more candidate sets of CCs for each CC set of the one or more CC sets; or program code executable by the computer for causing the computer to report a maximum number of CCs includable in each CC set of the one or more CC sets.

In a fifty-fourth aspect of a base station configured with non-transitory computer-readable medium having program code recorded thereon, the program code includes program code executable by a computer for causing the computer to receive, by the base station from a served UE, a cooperative configuration with one or more member UEs of a virtual UE; program code executable by the computer for causing the computer to receive, by the base station from the served UE, associations between a plurality of CCs allocated to a cell group and each member UE of the virtual UE; program code executable by the computer for causing the computer to transmit, by the base station, an uplink control transmission configuration message dividing the each member UE of the virtual UE into an assigned uplink control transmission group of a plurality of uplink control transmission groups and assigning, in response to the associations, one or more component CCs of the plurality of CCs into one or more CC sets, wherein each CC set of the one or more CC sets is assigned to each uplink control transmission group of the plurality of uplink control transmission groups; and program code executable by the computer for causing the computer to transmit, by the base station, an uplink scheduling message to the served UE, wherein the uplink scheduling message includes an uplink schedule for CCs within the CC set assigned to an uplink control transmission group associated with the served UE.

In a fifty-fifth aspect, alone or in combination with the fifty-fourth aspect, wherein the program code executable by the computer for causing the computer to receive the associations includes: program code executable by the computer for causing the computer to receive a capability message including the associations, wherein the associations include one or more supported frequency band combination identifications for each member UE of the virtual UE.

In a fifty-sixth aspect, alone or in combination with the fifty-fourth aspect and the fifty-fifth aspect, wherein the one or more supported frequency band combination identifications includes one of: identification of the one or more CC sets; a list of CCs available for each CC set of the one or more CC sets; a list of unusable CCs unavailable for each CC set of the one or more CC sets; a list of available frequency bands available for each CC set of the one or more CC sets; a list of unusable frequency bands unavailable for each CC set of the one or more CC sets; or a maximum number of CCs includable in each CC set of the one or more CC sets.

In a fifty-seventh aspect, alone or in combination with any one or more of the fifty-fourth aspect through the fifty-sixty aspect, wherein the one or more supported frequency band combination identifications includes indication of a frequency band combination available for each CC set of the one or more CC sets.

In a fifty-eighth aspect, alone or in combination with any one or more of the fifty-fourth aspect through the fifty-seventh aspect, wherein the capability message further include characteristics of each band within the one or more supported frequency band combination identifications, wherein the characteristics include one or more of a bandwidth of each CC and a number of CCs.

In a fifty-ninth aspect, alone or in combination with any one or more of the fifty-fourth aspect through the fifty-eighth aspect, further including: program code executable by the computer for causing the computer to transmit, by the base station, a cell group configuration message to the served UE, wherein the cell group configuration message includes configuration of the plurality of CCs to the virtual UE.

In a sixtieth aspect, alone or in combination with any one or more of the fifty-fourth aspect through the fifty-ninth aspect, wherein the program code executable by the computer for causing the computer to receive the associations includes one of: program code executable by the computer for causing the computer to receive one or more candidate sets of CCs for each CC set of the one or more CC sets; or program code executable by the computer for causing the computer to receive a maximum number of CCs includable in each CC set of the one or more CC sets.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-8 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication performed by a user equipment (UE), the method comprising:

reporting, by the UE to a serving base station, a cooperative configuration with one or more member UEs of a virtual UE;

reporting, by the UE to the serving base station, associations between a plurality of component carriers (CCs) allocated to a cell group and one or more member UEs of the virtual UE, the reporting includes transmitting a capability message including the associations, wherein the associations include one or more supported frequency band combination identifications for the one or more member UEs of the virtual UE;

receiving, by the UE, an uplink control transmission configuration message dividing the one or more member UEs of the virtual UE into an assigned uplink control transmission group of a plurality of uplink control transmission groups and assigning one or more component CCs of the plurality of CCs into one or more CC sets, wherein a CC set of the one or more CC sets is assigned to an uplink control transmission group of the plurality of uplink control transmission groups; and receiving, by the UE, an uplink scheduling message from the serving base station, wherein the uplink scheduling message includes an uplink schedule for CCs within the CC set assigned to the uplink control transmission group associated with the UE.

2. The method of claim 1, wherein the one or more supported frequency band combination identifications includes one of:

identification of the one or more CC sets;

a list of CCs available for each CC set of the one or more CC sets;

a list of unusable CCs unavailable for each CC set of the one or more CC sets;

a list of available frequency bands available for each CC set of the one or more CC sets;

a list of unusable frequency bands unavailable for each CC set of the one or more CC sets; or a maximum number of CCs includable in each CC set of the one or more CC sets.

3. The method of claim 1, wherein the one or more supported frequency band combination identifications includes indication of a frequency band combination available for each CC set of the one or more CC sets.

4. The method of claim 3, further comprising:

determining, by the UE, that one of a CC or a frequency band is available in the frequency band combination of at least two CC sets of the one or more CC sets; and setting, by the UE, the one of the CC or the frequency band available for the at least two CC sets to the frequency band combination of a first CC set of the at least two CC sets when at least one of an additional CC or an additional frequency band of the frequency band combination of other CC sets of the at least two CC sets is configured for the virtual UE.

5. The method of claim 4, wherein the capability message further include characteristics of each band within the one or more supported frequency band combination identifications, wherein the characteristics include one or more of a bandwidth of each CC and a number of CCs.

6. The method of claim 1, further including:

receiving, by the UE, a cell group configuration message from the serving base station, wherein the cell group configuration message includes configuration of the plurality of CCs to the virtual UE.

7. The method of claim 6, wherein the reporting the associations includes one of:

reporting one or more candidate sets of CCs for each CC set of the one or more CC sets; or reporting a maximum number of CCs includable in each CC set of the one or more CC sets.

8. A method of wireless communication performed by a base station, the method comprising:

receiving, by the base station from a served user equipment (UE), a cooperative configuration with one or more member UEs of a virtual UE;

receiving, by the base station from the served UE, a capability message including associations between a plurality of component carriers (CCs) allocated to a cell group and member UEs of the virtual UE, the associations include one or more supported frequency band combination identifications for member UEs of the virtual UE;

transmitting, by the base station, an uplink control transmission configuration message dividing the member UEs of the virtual UE into an assigned uplink control transmission group of a plurality of uplink control transmission groups and assigning, in response to the associations, one or more component CCs of the plurality of CCs into one or more CC sets, wherein a CC set of the one or more CC sets is assigned to an uplink control transmission group of the plurality of uplink control transmission groups; and transmitting, by the base station, an uplink scheduling message to the served UE, wherein the uplink scheduling message includes an uplink schedule for CCs within the CC set assigned to the uplink control transmission group associated with the served UE.

9. The method of claim 8, wherein the one or more supported frequency band combination identifications includes one of:

identification of the one or more CC sets;

a list of CCs available for each CC set of the one or more CC sets;

a list of unusable CCs unavailable for each CC set of the one or more CC sets;

a list of available frequency bands available for each CC set of the one or more CC sets;

a list of unusable frequency bands unavailable for each CC set of the one or more CC sets; or a maximum number of CCs includable in each CC set of the one or more CC sets.

10. The method of claim 8, wherein the one or more supported frequency band combination identifications includes indication of a frequency band combination available for each CC set of the one or more CC sets.

11. The method of claim 10, wherein the capability message further include characteristics of each band within the one or more supported frequency band combination identifications, wherein the characteristics include one or more of a bandwidth of each CC and a number of CCs.

12. The method of claim 8, further including:

transmitting, by the base station, a cell group configuration message to the served UE, wherein the cell group configuration message includes configuration of the plurality of CCs to the virtual UE.

13. The method of claim 12, wherein the receiving the associations includes one of:

receiving one or more candidate sets of CCs for each CC set of the one or more CC sets; or receiving a maximum number of CCs includable in each CC set of the one or more CC sets.

14. A user equipment (UE) configured for wireless communication, the UE comprising:

at least one processor; and a memory coupled to the at least one processor, wherein the at least one processor:

reports, by the UE to a serving base station, a cooperative configuration with one or more member UEs of a virtual UE;

reports, by the UE to the serving base station, associations between a plurality of component carriers (CCs) allocated to a cell group and member UEs of the virtual UE, the reporting includes transmitting a capability message including the associations, wherein the associations include one or more supported frequency band combination identifications for the member UEs of the virtual UE;

receives, by the UE, an uplink control transmission configuration message dividing the member UEs of the virtual UE into an assigned uplink control transmission group of a plurality of uplink control transmission groups and assigning one or more component CCs of the plurality of CCs into one or more CC sets, wherein a CC set of the one or more CC sets is assigned to an uplink control transmission group of the plurality of uplink control transmission groups; and receives, by the UE, an uplink scheduling message from the serving base station, wherein the uplink scheduling message includes an uplink schedule for CCs within the CC set assigned to the uplink control transmission group associated with the UE.

15. The UE of claim 14, wherein the one or more supported frequency band combination identifications includes one of:

identification of the one or more CC sets;

a list of CCs available for each CC set of the one or more CC sets;

a list of unusable CCs unavailable for each CC set of the one or more CC sets;

a list of available frequency bands available for each CC set of the one or more CC sets;

a list of unusable frequency bands unavailable for each CC set of the one or more CC sets; or a maximum number of CCs includable in each CC set of the one or more CC sets.

16. The UE of claim 14, wherein the one or more supported frequency band combination identifications includes indication of a frequency band combination available for each CC set of the one or more CC sets.

17. The UE of claim 16, further comprising configuration of the at least one processor:

to determine, by the UE, that one of a CC or a frequency band is available in the frequency band combination of at least two CC sets of the one or more CC sets; and to set, by the UE, the one of the CC or the frequency band available for the at least two CC sets to the frequency band combination of a first CC set of the at least two CC sets when at least one of an additional CC or an additional frequency band of the frequency band combination of other CC sets of the at least two CC sets is configured for the virtual UE.

18. The UE of claim 17, wherein the capability message further include characteristics of each band within the one or more supported frequency band combination identifications, wherein the characteristics include one or more of a bandwidth of each CC and a number of CCs.

19. The UE of claim 14, further including configuration of the at least one processor:

to receive, by the UE, a cell group configuration message from the serving base station, wherein the cell group configuration message includes configuration of the plurality of CCs to the virtual UE.

20. The UE of claim 19, wherein the configuration of the at least one processor to report the associations includes configuration of the at least one processor to one of:

report one or more candidate sets of CCs for each CC set of the one or more CC sets; or report a maximum number of CCs includable in each CC set of the one or more CC sets.

21. A base station configured for wireless communication, the base station comprising:

at least one processor; and a memory coupled to the at least one processor, wherein the at least one processor:

receives, by the base station from a served user equipment (UE), a cooperative configuration with one or more member UEs of a virtual UE;

receives, by the base station from the served UE, a capability message including associations between a plurality of component carriers (CCs) allocated to a cell group and member UEs of the virtual UE, the associations include one or more supported frequency band combination identifications for the member UEs of the virtual UE;

transmits, by the base station, an uplink control transmission configuration message dividing the member UEs of the virtual UE into an assigned uplink control transmission group of a plurality of uplink control transmission groups and assigning, in response to the associations, one or more component CCs of the plurality of CCs into one or more CC sets, wherein a CC set of the one or more CC sets is assigned to an uplink control transmission group of the plurality of uplink control transmission groups; and transmits, by the base station, an uplink scheduling message to the served UE, wherein the uplink scheduling message includes an uplink schedule for CCs within the CC set assigned to the uplink control transmission group associated with the served UE.

22. The base station of claim 21, wherein the one or more supported frequency band combination identifications includes one of:

identification of the one or more CC sets;

a list of CCs available for each CC set of the one or more CC sets;

a list of unusable CCs unavailable for each CC set of the one or more CC sets;

a list of available frequency bands available for each CC set of the one or more CC sets;

a list of unusable frequency bands unavailable for each CC set of the one or more CC sets; or a maximum number of CCs includable in each CC set of the one or more CC sets.

23. The base station of claim 22, wherein the one or more supported frequency band combination identifications includes indication of a frequency band combination available for each CC set of the one or more CC sets.

24. The base station of claim 23, wherein the capability message further include characteristics of each band within the one or more supported frequency band combination identifications, wherein the characteristics include one or more of a bandwidth of each CC and a number of CCs.

25. The base station of claim 21, further including configuration of the at least one processor:

to transmit, by the base station, a cell group configuration message to the served UE, wherein the cell group configuration message includes configuration of the plurality of CCs to the virtual UE.

26. The base station of claim 25, wherein the configuration of the at least one processor to receive the associations includes configuration of the at least one processor to one of:

receive one or more candidate sets of CCs for each CC set of the one or more CC sets; or receive a maximum number of CCs includable in each CC set of the one or more CC sets.

* * * * *